United States Patent [19]

Fullerton et al.

[11] Patent Number: 5,677,927
[45] Date of Patent: Oct. 14, 1997

[54] ULTRAWIDE-BAND COMMUNICATION SYSTEM AND METHOD

[75] Inventors: Larry W. Fullerton, Huntsville; Ivan A. Cowie, Madison, both of Ala.

[73] Assignee: Pulson Communications Corporation, McLean, Va.

[21] Appl. No.: 309,973

[22] Filed: Sep. 20, 1994

[51] Int. Cl.⁶ .................................................. H04B 1/69
[52] U.S. Cl. ........................... 375/200; 375/210; 375/259; 375/367
[58] Field of Search .......................... 375/200, 208–210, 375/259, 367; 370/320, 342, 441, 515

[56] References Cited

U.S. PATENT DOCUMENTS

| | | | |
|---|---|---|---|
| 3,593,138 | 7/1971 | Dunn et al. | 375/285 X |
| 3,866,230 | 2/1975 | Tewksbury | 343/178 |
| 4,984,247 | 1/1991 | Kaufmann et al. | 375/200 |
| 5,214,669 | 5/1993 | Zarembowitch | 375/1 |
| 5,222,103 | 6/1993 | Gross | 375/281 |
| 5,442,646 | 8/1995 | Chadwick et al. | 375/296 X |

FOREIGN PATENT DOCUMENTS

| | | |
|---|---|---|
| 962130 | 6/1950 | France . |
| WO 91/06155 | 5/1991 | France . |
| 28 16 353 A1 | 10/1979 | Germany . |
| 31 31 186 A1 | 2/1983 | Germany . |

OTHER PUBLICATIONS

J. H. McGuire et al., "A Common–Wave Duplex Pulse–Communication System," *Journal of the Institution of Electrical Engineers*, vol. 94, No. 13, (1947), pp. 528–532.

*Primary Examiner*—Young T. Tse
*Attorney, Agent, or Firm*—Sterne, Kessler, Goldstein & Fox P.L.L.C.

[57] ABSTRACT

An impulse radio communications system using one or more subcarriers to communicate information from an impulse radio transmitter to an impulse radio receiver. The impulse radio communication system is an ultrawide-band time domain system. The use of subcarriers provides impulse radio transmissions added channelization, smoothing and fidelity. Subcarriers of different frequencies or waveforms can be used to add channelization of impulse radio signals. Thus, an impulse radio link can communicate many independent channels simultaneously by employing different subcarriers for each channel. The impulse radio uses modulated subcarrier(s) for time positioning a periodic timing signal or a coded timing signal. Alternatively, the coded timing signal can be summed or mixed with the modulated subcarrier(s) and the resultant signal is used to time modulate the periodic timing signal. Direct digital modulation of data is another form of subcarrier modulation for impulse radio signals. Direct digital modulation can be used alone to time modulate the periodic timing signal or the direct digitally modulated the periodic timing signal can be further modulated with one or more modulated subcarrier signals. Linearization of a time modulator permits the impulse radio transmitter and receiver to generate time delays having the necessary accuracy for impulse radio communications.

32 Claims, 27 Drawing Sheets

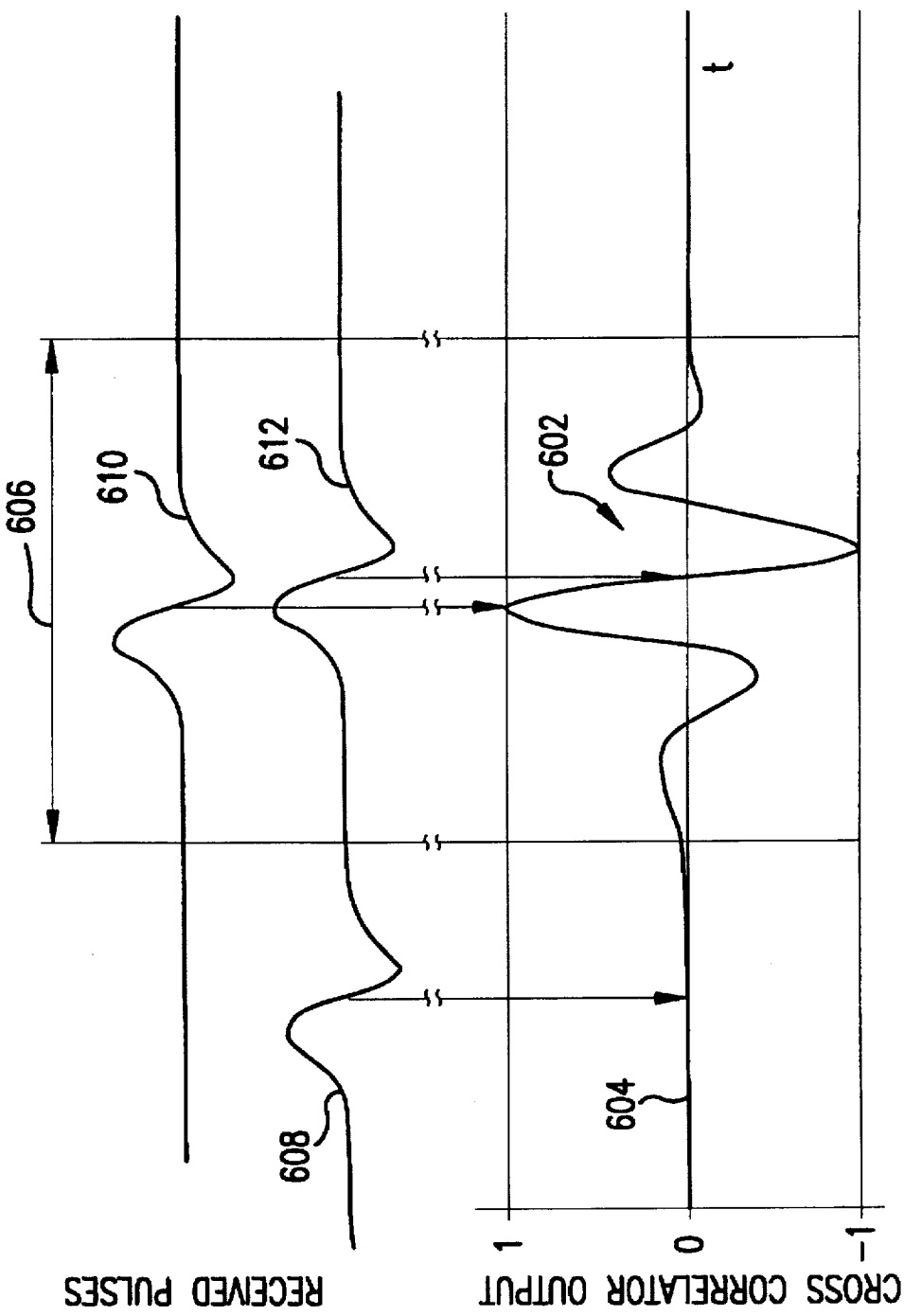

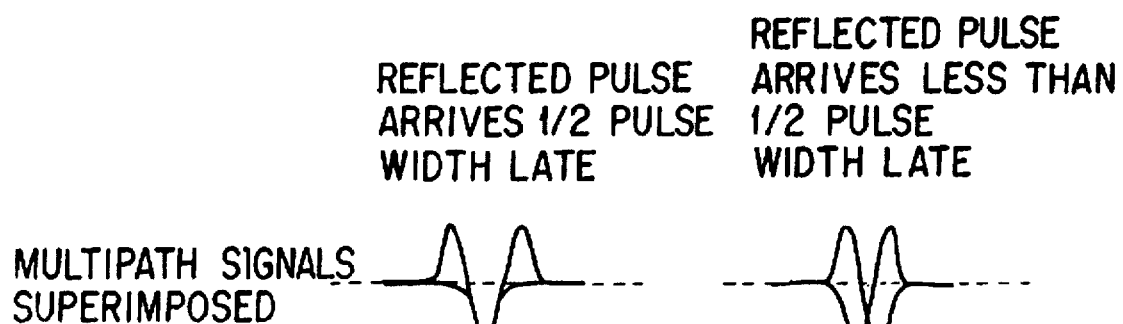
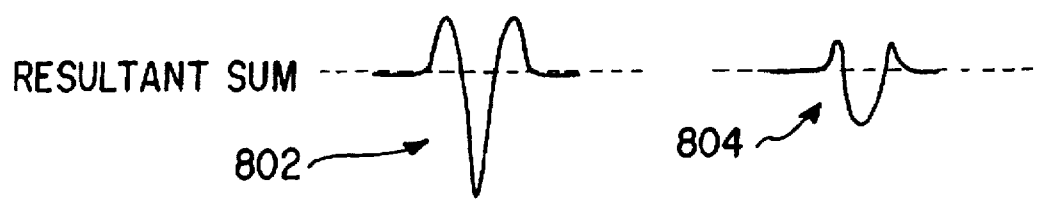
FIG. 8A     FIG. 8C
FIG. 8B     FIG. 8D

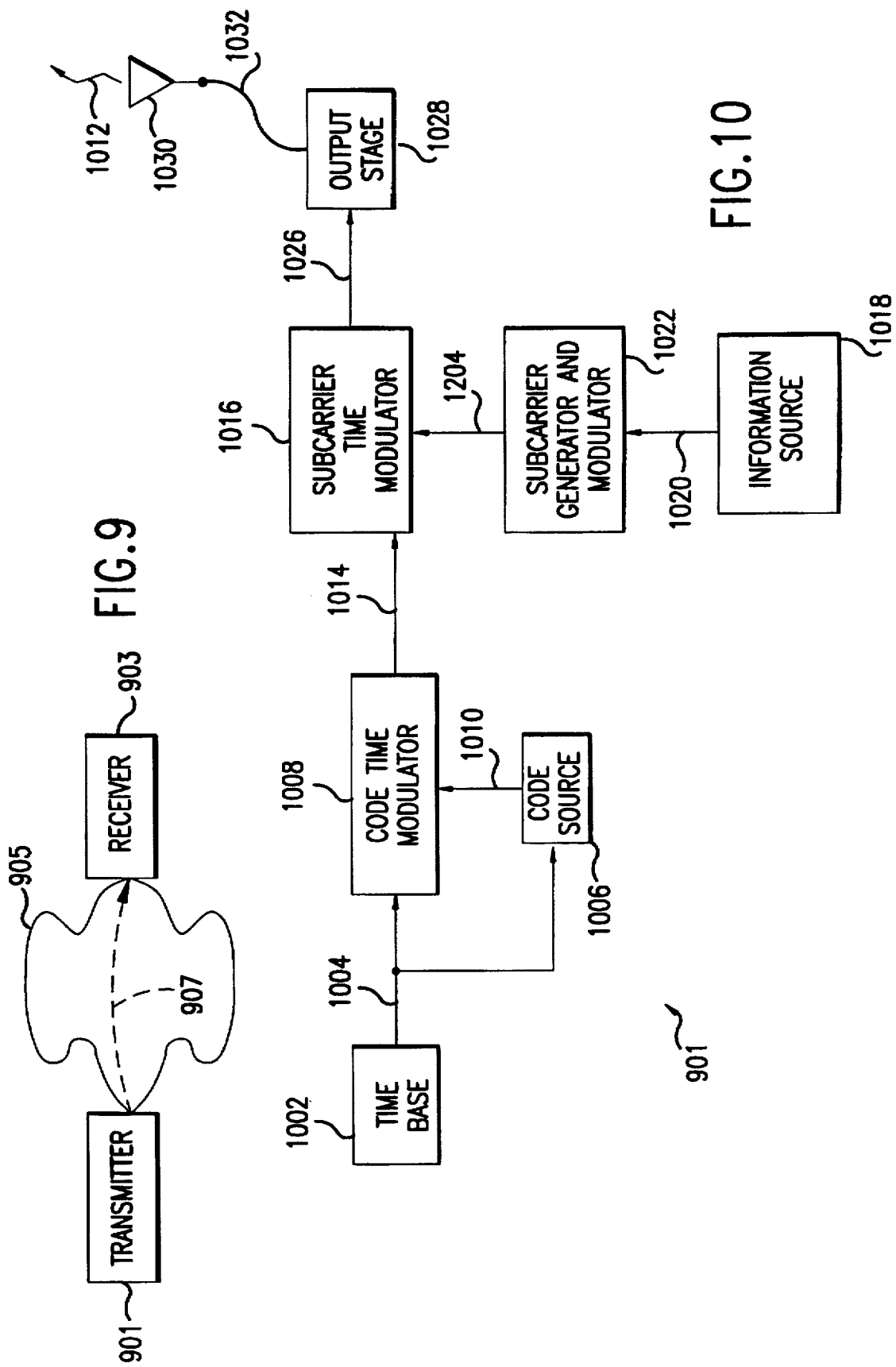

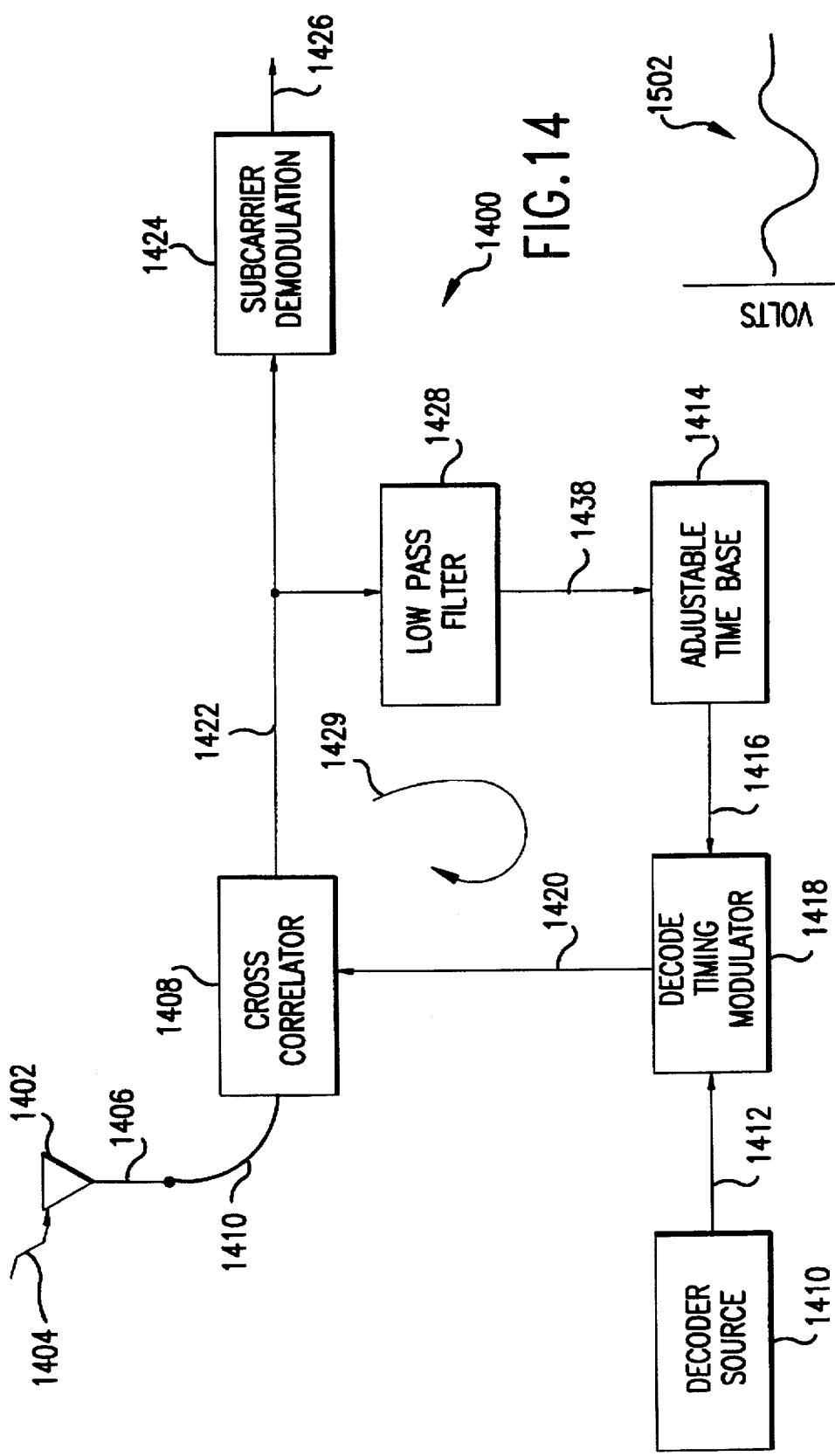

CORRESPONDING TO EACH Δt

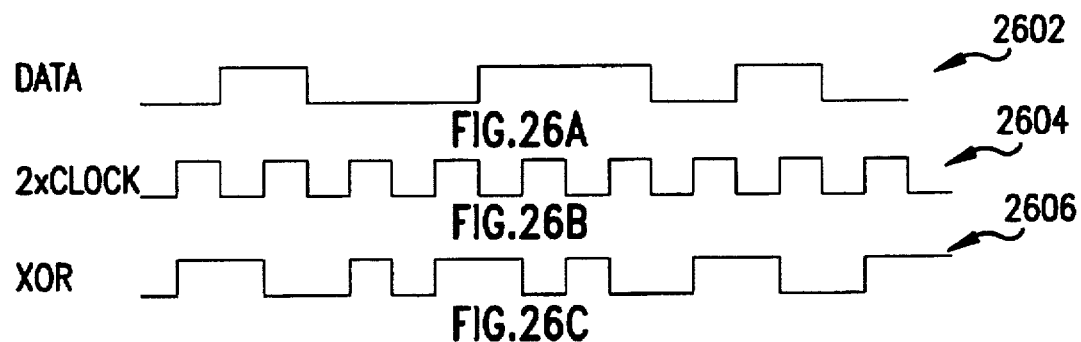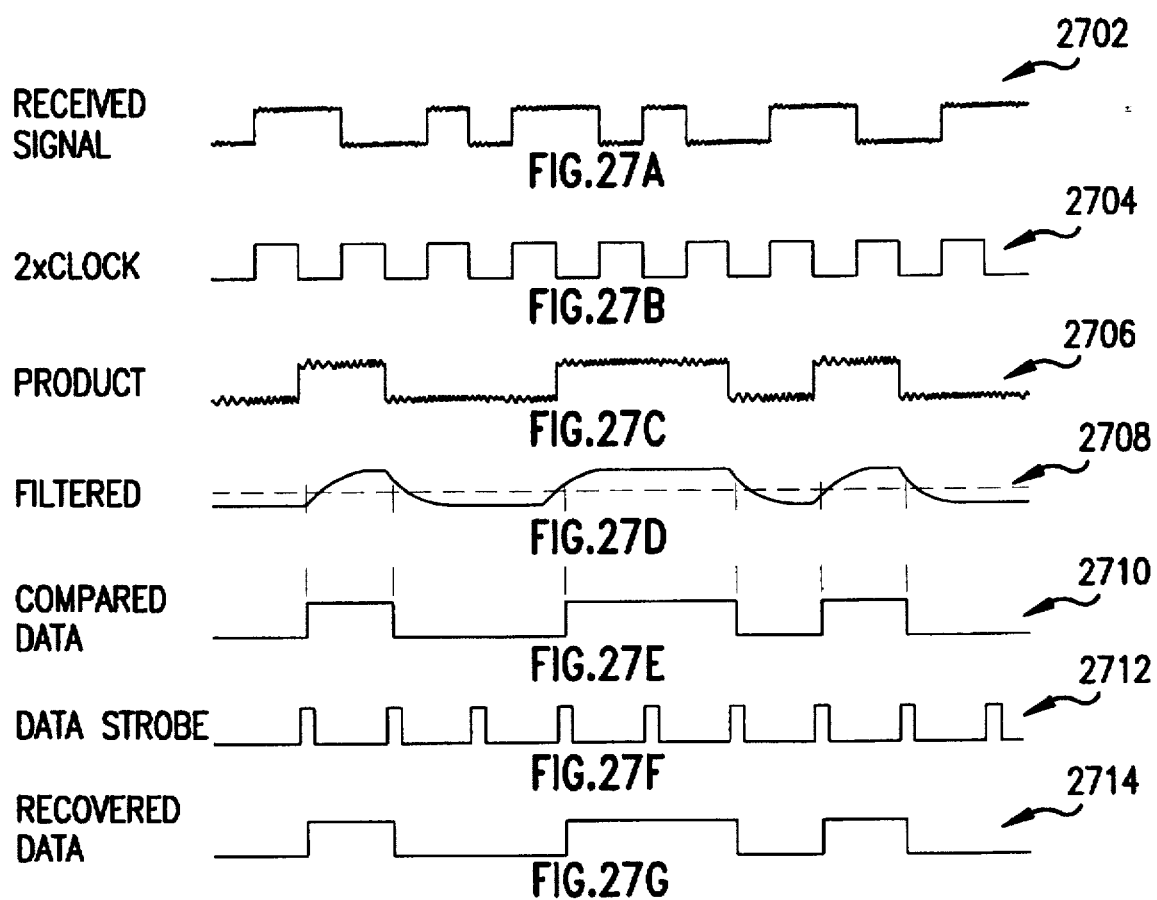

ULTRAWIDE-BAND COMMUNICATION SYSTEM AND METHOD

BACKGROUND OF THE INVENTION

1. Field of the Invention

The present invention relates to the field of communications, and more particularly, the present invention relates to ultrawide-band impulse communication systems and methods employing subcarriers.

2. Related Art

Designers of radio technology for personal communications devices, medical and military devices, and the like, are currently faced with several development challenges. Low power consumption, reuse of available spectrum, channelization and cost are four of the main issues.

These issues are addressed in part by an emerging, revolutionary technology called impulse radio communications (hereafter called impulse radio). Impulse radio was first fully described in a series of patents, including U.S. Pat. No. 4,641,317 (issued Feb. 3, 1987), U.S. Pat. No. 4,813,057 (issued Mar. 14, 1989) and U.S. Pat. No. 4,979,186 (issued Dec. 18, 1990) and U.S. Pat. No. 5,303,108 (issued Nov. 8, 1994) (filed Jun. 20, 1989) all to Larry W. Fullerton. These patent documents are incorporated herein by reference.

Basic impulse radio transmitters emit short Gaussian monocycle pulses with tightly controlled average pulse-to-pulse interval. Impulse radio systems use pulse position modulation. Pulse position modulation is a form of time modulation in which the value of each instantaneous sample of a modulating signal is caused to modulate the position in time of a pulse.

For impulse radio communications, the pulse-to-pulse interval is varied on a pulse-by-pulse basis by two components: an information component and a pseudo-random code component. Spread spectrum systems make use of pseudo-random codes to spread the normally narrowband information signal over a relatively wide band of frequencies. A spread spectrum receiver correlates these signals to retrieve the original information signal. Unlike spread spectrum systems, the pseudo-random code for impulse radio communications is not necessary for energy spreading because the monocycle pulses themselves have an inherently wide information bandwidth (information bandwidth, hereafter called bandwidth, is the range of frequencies within which performance, with respect to some characteristics, falls within specific limits). Instead, the pseudo-random code is used for channelization, energy smoothing in the frequency domain, and jamming resistance.

The impulse radio receiver is a homodyne receiver with a cross correlator front end. The front end coherently converts an electromagnetic pulse train of monocycle pulses to a baseband signal in a single stage. (The baseband signal is the basic information channel for the basic impulse radio communications system, and is also referred to as the information bandwidth.) The data rate of the impulse radio transmission is only a fraction of the periodic timing signal used as a time base. Each data bit time position modulates many pulses of the periodic timing signal. This yields a modulated, coded timing signal that comprises a train of identical pulses for each single data bit. The cross correlator of the impulse radio receiver integrates multiple pulses to recover the transmitted information.

As with all aspects of the electronics field, what is desired are still smaller, lower power and more flexible systems. However, generally accepted principles in continuous wave (CW) radio technology do not readily lend themselves to time domain systems, such as impulse radio.

Descriptions of some of the basic concepts discussed below are found in a number of references, including Robert C. Dixon, *Spread Spectrum Systems* (John Wiley & Sons, Inc., New York, 1984, 2nd ed.); and Don J. Torrieri, *Principles of Military Communication Systems* (Artech House, Inc., Dedham Massachusetts, 1982, 3rd ed.).

SUMMARY OF THE INVENTION

The impulse radio communications system according to the present invention uses one or more subcarriers to communicate information from an impulse radio transmitter to an impulse radio receiver. Three impulse radio communications system embodiments are described, including: a one channel system, a two channel system and a three or more channel system. Typical radio frequency impulse radio communications system applications include cellular telephones, wireless telephones, wireless PBXs/Local area networks, and the like. The impulse radio communication system is an ultrawide-band time domain system. Operation in the time domain is in accordance with general impulse radio theories discussed below in section II. The use of subcarriers provides impulse radio transmissions added channelization, smoothing and fidelity. Subcarriers of different frequencies or waveforms can be used (simultaneously) to add channelization of impulse radio signals. Thus, an impulse radio link can communicate many independent channels simultaneously by employing different subcarriers for each channel.

There are three impulse radio transmitter embodiments. The first and second transmitter embodiments comprise a subcarrier generator and modulator that uses one or more information signals to modulate a periodic timing signal.

According to the first embodiment, coding of the impulse radio signals is achieved by coding the periodic timing signal before it is time modulated by the modulated subcarrier signal.

According to the second embodiment, coding of the impulse radio signals is achieved by coding a modulated subcarrier signal before it is used to time modulate the periodic timing signal.

The third transmitter embodiment comprises a subcarrier generator and modulator that uses one or more information signals to modulate a periodic timing signal in combination with direct digital modulation of a digital data signal. In this embodiment, the modulated subcarrier signal is used to time modulate the direct digitally modulated signal.

The impulse radio transmitter generally comprises a time base that generates a periodic timing signal. The time base comprises a voltage controlled oscillator, or the like, having sub-nanosecond timing requirements. The periodic timing signal is supplied to a code source and to a code time modulator. The code source comprises a storage device for storing nearly orthogonal pseudo-random noise (PN) codes and means for outputting the PN codes as a code signal. The code source monitors the periodic timing signal to permit the code signal to be synchronized to the code time modulator. In one embodiment, the code time modulator uses the code signal to modulate the periodic timing signal for channelization and smoothing of a final emitted impulse radio signal. The output of the code time modulator is called the coded timing signal.

The coded timing signal is supplied to a subcarrier time modulator for information modulation thereof. Prior impulse systems used non-subcarrier, baseband modulation. In other words, the information itself was used for modulation. In the present invention, however, an information source supplies an information signal to a subcarrier generator and modulator. The information signal can be any type of intelligence, including digital bits representing voice, data, imagery, or the like, analog signals, or complex signals.

The subcarrier generator and modulator of the present invention generates a modulated subcarrier signal that is modulated by the information signal, and supplies the modulated subcarrier signal to the subcarrier time modulator. Thus, the modulated subcarrier signal is used by the subcarrier time modulator to modulate the carrier, which in this case is the coded timing signal. Modulation of the coded timing signal by the subcarrier time modulator generates a modulated, coded timing signal that is sent to an output stage.

The output stage uses the modulated, coded timing signal as a trigger to generate monocycle pulses. In a radio frequency embodiment, the monocycle pulses are sent to a transmit antenna via a transmission line coupled thereto. The monocycle pulses are converted into propagating electromagnetic pulses by the transmit antenna. The emitted signal propagates to an impulse radio receiver through a propagation medium, such as air in a radio frequency embodiment. In the preferred embodiment, the emitted signals are wideband or ultrawide-band signals. The spectrum of the emitted signals can be modified by filtering of the monocycle pulses. This filtering will cause each monocycle pulse to have more zero crossings in the time domain. In this case, the impulse radio receiver must use a similar waveform in the cross correlator to be efficient.

There are several impulse radio receiver embodiments. Each impulse radio receiver generally comprises a cross correlator, a decode source, a decode timing modulator and adjustable time base and a subcarrier demodulator.

The decode source generates a decode control signal corresponding to the PN code used by an impulse radio transmitter communicating an impulse radio signal. The adjustable time base generates a periodic timing signal that comprises a train of template signal pulses having waveforms substantially equivalent to each pulse of the received (impulse radio) signal.

The decode timing modulator uses the decode control signal to position in time a periodic timing signal to produce a decode signal. The decode signal is thus matched in time to the known PN code of the transmitter so that the received signal can be detected in the cross correlator.

The decode signal is used to produce a template signal having a waveform designed to match the received signal. The template signal is positioned in time according to the known PN code of the transmitter and is then cross correlated with the received signal. Successive cross correlation output signals are integrated to recover the impulse radio signal out of the noise. Once retrieved in this manner, the signal is demodulated to remove the subcarrier and yield the information signal.

The baseband signal is also input to a lowpass filter. A control loop comprising the lowpass filter is used to generate an error signal to provide minor phase adjustments to the adjustable time base to time position the periodic timing signal in relation to the position of the received signal.

In a preferred embodiment, a subcarrier in an impulse radio translates (or shifts) the baseband signals to a higher frequency. The subcarrier generation and modulator generates a signal that is modulated by the information signal by frequency modulation (FM) techniques, amplitude modulation (AM), phase modulation, frequency shift keying (FSK), phase shift keying (PSK), pulsed FM, or the like.

Other non-sinusoidal and/or non-continuous waveforms can also be employed as subcarriers in connection with the present invention. The modulated subcarrier signal is used to time shift the position of the pulses of the coded timing signal or the periodic timing signal. Thus, the signal that triggers the output stage is a train of pulse position modulated pulses. In another embodiment, direct digital modulation using Manchester encoding is employed as a subcarrier. Combination of these subcarrier techniques is also described.

The effect of using the cross correlation function for the modulation transfer function is to cause the output of the receiver to be a non-linear function of the amplitude of the input. For baseband modulation, this is undesirable. However, for subcarriers, such as FM, AM, FSK, PSK and Manchester, the harmonics are filtered thereby eliminating any distortion. Such filtering can not remove harmonics when baseband modulation is used, because the harmonics stay at baseband, and thus the signal is irrecoverable.

The addition of subcarriers also provides added fidelity in the form of more bandwidth and better signal-to-noise, compared to baseband modulation alone. This benefit is attributed to the fact that the subcarrier inherently renders the information more impervious to noise. The subcarrier embodiments provide less signal compression, and lower signal distortion by reducing baseband noise for high reliability voice, data and/or imagery communications.

The linearity requirements for the modulation using the cross correlator are greatly relaxed by using the subcarrier technique of the present invention. The use of a subcarrier for impulse radios also improves harmonic distortion due to a non-linear modulation transfer function, compared to baseband modulation. Modulation transfer characteristics have to be extremely linear in order to successfully transfer low distortion speech or music. This is very difficult to achieve in a non-subcarrier baseband impulse system.

The foregoing and other features and advantages of the present invention will be apparent from the following more particular description of the preferred embodiments of the invention, as illustrated in the accompanying drawings.

BRIEF DESCRIPTION OF THE DRAWINGS

FIGS. 6A and 6B shows the cross correlator transfer function of an impulse radio receiver in accordance with the present invention.

FIGS. 8A, 8B, 8C and 8D illustrates the phase of the multipath pulse in accordance with the present invention.

FIG. 9 shows a representative block diagram of an impulse radio electrical system using one subcarrier channel in accordance with the present invention.

FIG. 10 shows an impulse radio transmitter of an impulse radio communication system in accordance with the present invention.

FIG. 14 shows an impulse radio receiver in accordance with the present invention.

FIG. 15 shows a representative plot of a pulse corresponding to the received signal in connection with the receiver 1400 in accordance with the present invention.

FIGS. 26A, 26B, 26C, 27A, 27B, 27C, 27D, 27E, 27F and 27G show exemplary waveforms for pseudo Manchester encoding and decoding, respectively, in accordance with the present invention.

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

Table of Contents

Figure 1B:
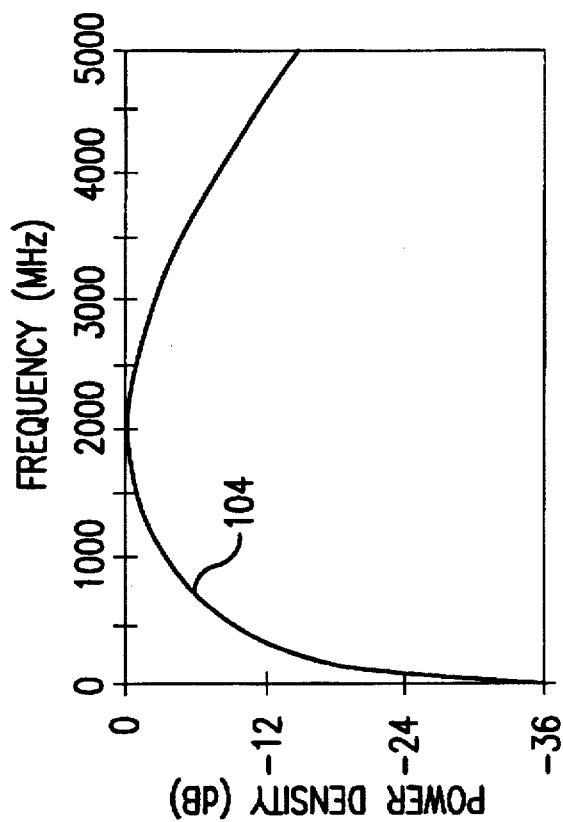
FIGS. 1A and 1B show a 2 GHz center frequency monocycle pulse in the time and frequency domains, respectively, in accordance with the present invention.

I. Overview
II. Technology Basics
   II.1 Gaussian Monocycle
   II.2 A Pulse Train
   II.3 Modulation
   II.4 Coding for Energy Smoothing and Channelization
   II.5 Reception and Demodulation
   II.6 Jam Resistance
   II.7 Processing Gain
   II.8 Capacity
   II.9 Multipath and Propagation
III. The Subcarrier Invention
   III.1 Theory of Operation
   III.2 One Channel with Improvement over Baseband Alone
      III.2.a. Transmitter
      III.2.b. Receiver
   III.3 Two or More Subcarrier Channels (e.g., voice, digital data and control information)
IV. The Time Modulator
V. Linearization
   V.1. Transmitter
   V.2. Receiver
VI. Pseudo Manchester Modulation
VII. Lock Acquisition Scheme
VIII. Performance in the Real World
IX. Conclusion

I. Overview

The impulse radio communication system is an ultrawide-band time domain system that operates in the time domain and uses one or more subcarriers to provide channelization, smoothing and fidelity. A single impulse radio transmission (e.g., a link) can therefore communicate many independent channels simultaneously by employing different subcarriers for each channel.

The impulse radio transmitter according to the present invention uses modulated subcarrier(s) for time positioning a periodic timing signal or a coded timing signal. Alternatively, the coded timing signal can be mixed (or summed) with the modulated subcarrier(s) and the resultant signal used to time modulate the periodic timing signal. Direct digital modulation of data is another form of subcarrier modulation for impulse radio signals. Direct digital modulation can be used alone to time modulate the periodic timing signal or the direct digitally modulated periodic timing signal can be further modulated with one or more modulated subcarrier signals.

Impulse radio technology according to the present invention is widely applicable for wireless communications applications. Because impulse radio is not a continuous wave (CW) carrier-based system, the use of a subcarrier is an elegant, counter intuitive addition to the time domain impulse radio design. Signal-to-noise is improved considerably compared to non-subcarrier impulse radio transmissions.

At first blush, the addition of a subcarrier to an impulse radio communication system would appear superfluous. However, the layering of subcarrier modulation over information modulation and PN code smoothing in an impulse radio system yields an elegant result.

Impulse radios generally have: short duration pulses; center frequencies typically between 50 MHz and 10 gigahertz (GHz); ultrawide bandwidths of 100+% of the center frequency; multi-mile ranges with sub-milliwatt average power levels, even with low gain antennas; extremely low power spectral densities; lower cost than other sophisticated radio designs, especially spread spectrum systems; and excellent immunity to jamming from other systems and to multipath fading.

Additionally, impulse radios have exceptional multipath immunity, they are relatively simple and less costly to build, especially in comparison to spread spectrum radios. Impulse radio systems consume substantially less power than existing conventional radios. Additionally, impulse radio systems occupy less space than existing portable telecommunications transceivers.

Because of these characteristics impulse radio is an optimal technology for a wide variety of applications, including personal communications systems and in-building communications systems.

The following sections II through VIII are a detailed description of the present invention.

Section II is directed to technology basics and provides the reader with an introduction to impulse radio concepts, as well as other relevant aspects of communications theory. This section includes subsections relating to Gaussian monocycle pulses, pulse trains of gaussian monocycle pulses, modulation, coding, and qualitative and quantitative characteristics of these concepts.

Section III is directed to the use of subcarriers for impulse radio communication systems. This section includes subsections relating to the theory of operation of subcarriers for the impulse radio transmitter and receiver. The description is sectioned to describe a one channel embodiment with improvement over baseband alone and a two or more subcarrier channel embodiment Section IV is directed to the time modulator that is used for code time delaying, subcarrier time delaying and a combination of both. The operation and structure of several embodiments for using the time modulator for subcarrier impulse radio communications are described.

Section V is directed to linearization of the time modulator for both the impulse radio transmitter and receiver. Linearization of the time modulator permits the impulse radio transmitter and receiver to generate time delays having the necessary accuracy for impulse radio communications.

Section VI is directed to pseudo Manchester coding for modulation of digital data using impulse radio communications.

Section VII is directed to a lock acquisition scheme for the impulse radio receiver to acquire and maintain lock of impulse radio signals.

Section VIII describes the performance of impulse radio communications systems in the real world with reference to data collected by the inventors based on prototype testing.

II. Technology Basics

This section is directed to technology basics and provides the reader with an introduction to impulse radio concepts, as well as other relevant aspects of communications theory. This sections includes subsections relating to Gaussian monocycle pulses, pulse trains of gaussian monocycle pulses, modulation, coding, and qualitative and quantitative characteristics of these concepts.

Impulse radio transmitters emit short Gaussian monocycle pulses with a tightly controlled average pulse-to-pulse interval. Impulse radio transmitters use pulse widths of between 20 and 0.1 nanoseconds (ns) and pulse-to-pulse intervals of between 2 and 5000 ns. These narrow monocycle pulses have inherently wide-band frequency characteristics.

Impulse radio systems uses pulse position modulation, with the actual pulse-to-pulse interval being varied on a pulse-by-pulse basis by two components: an information component and a pseudo-random code component. Unlike spread spectrum systems, the pseudo-random code is not necessary for energy spreading (because the impulses themselves are inherently wide-band), but rather for channelization, energy smoothing in the frequency domain, and jamming resistance.

The impulse radio receiver is a homodyne receiver with a cross correlator front end. The front end coherently converts the electromagnetic pulse train to a baseband signal in one stage. The impulse radio receiver integrates multiple pulses to recover each bit of the transmitted information.

II.1 Gaussian Monocycle

Figure 1A:
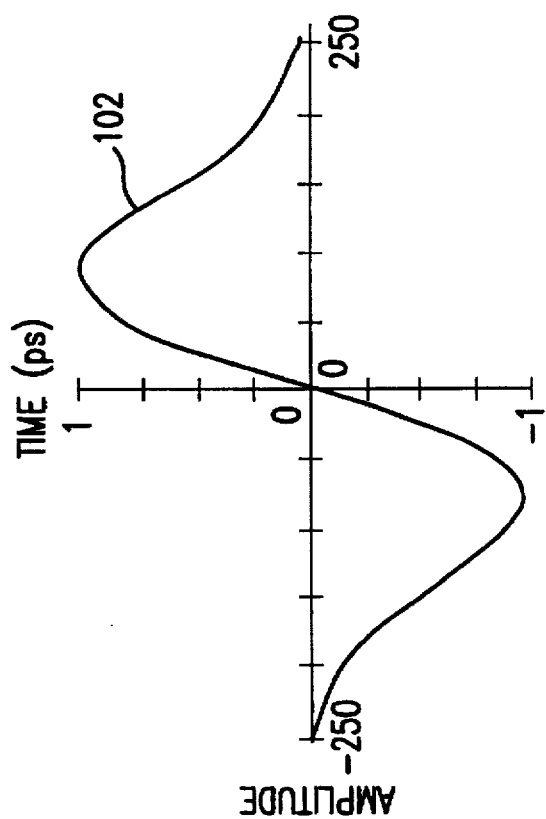

The most basic element of impulse radio technology is the practical implementation of a Gaussian monocycle, which are also referred to herein as Gaussian monocycle pulses. A Gaussian monocycle is the first derivative of the Gaussian function. FIGS. 1A and 1B show a 2 GHz center frequency (i.e., a 0.5 ns pulse width) monocycle pulse in the time and frequency domains (see 102 and 104, respectively). (Actual practice prevents the transmission of a perfect Gaussian monocycle. In the frequency domain, this results in a slight reduction in the signal's bandwidth.) These monocycles, which are sometimes called impulses, are not gated sine waves.

The Gaussian monocycle waveform is naturally a wide bandwidth signal, with the center frequency and the bandwidth completely dependent upon the pulse's width. In the time domain, the Gaussian monocycle is described mathematically by:

$$V(t) = A \frac{\sqrt{2e}}{\tau} t e^{-(\frac{t}{\tau})^2} \quad (1)$$

Where, A is the peak amplitude of the pulse, t is time, and τ (tau) is a time decay constant.

In the frequency domain, the Gaussian monocycle envelope is:

$$V(\omega) = A\omega\tau^2 \sqrt{2\pi e}\, e^{-\frac{\omega^2\tau^2}{2}} \quad (2)$$

The center frequency is then:

$$fc = \frac{1}{2\pi\tau} \text{ Hz} \quad (3)$$

Relative to c, the 3 dB down points (power) are:

$$f_{lower}=0.319\ c;\ f_{upper}=1.922\ c. \quad (4)$$

Thus, the bandwidth is approximately 160% of the center frequency. Because τ (tau) also defines the pulse width, then the pulse width specifies both the center frequency and bandwidth. In practice, the center frequency of a monocycle pulse is approximately the reciprocal of its length, and its bandwidth is approximately equal to 1.6 times the center frequency. Thus, for the "0.5 ns" pulse shown in FIGS. 1A and 1B:

$$f_c=2.0\text{ GHz};\ \Delta f_c=3.2\text{ GHz}. \quad (5)$$

II.2 A Pulse Train

Impulse radio systems use pulse trains, not single pulses, for communications. As described in detail below in section III, the impulse radio transmitter produces and outputs a train of pulses for each bit of information.

Figure 2B:
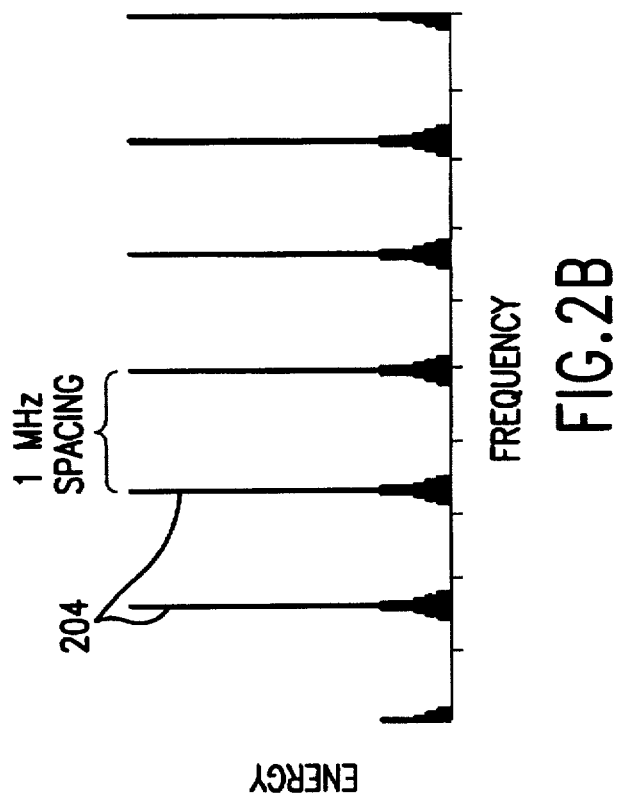
FIGS. 2A and 2B are illustrations of a 1 mpps system with 1 ns pulses in the time and frequency domains, respectively, in accordance with the present invention.
Figure 2A:
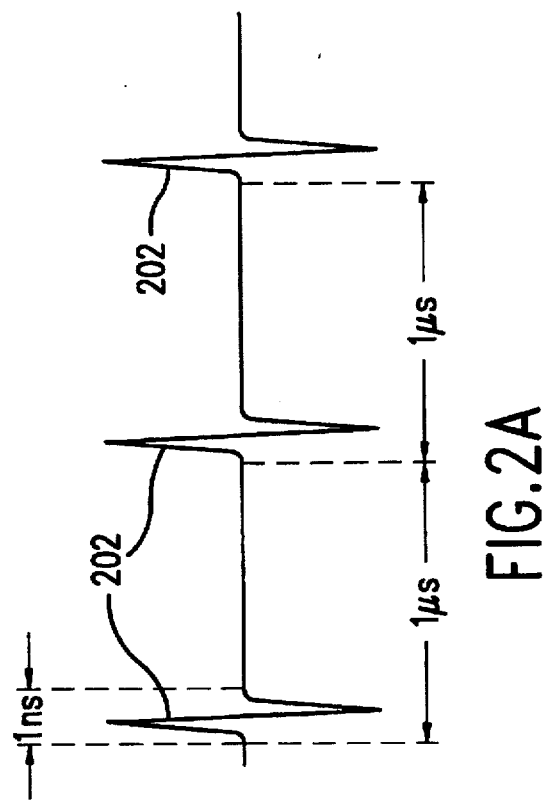

Prototypes built by the inventors have pulse repetition frequencies of between 0.7 and 10 megapulse per second (mpps, where each megapulse is $10^6$ pulses). FIGS. 2A and 2B are illustrations of a 1 mpps system with (uncoded, unmodulated) 1 ns pulses in the time and frequency domains (see 102 and 104 of FIG. 1, respectively). In the frequency domain, this highly regular pulse train produces energy spikes (comb lines 204) at one megahertz intervals; thus, the already low power is spread among the comb lines 204. This pulse train carries no information and, because of the regularity of the energy spikes, might interfere with conventional radio systems at short ranges.

Impulse radio systems have very low duty cycles so the average power time domain is significantly lower than its peak power in the time domain. In the example in FIGS. 2A and 2B, for example, the impulse transmitter operates 0.1% of the time (i.e., 1 ns per microsecond (μs)).

Additional processing is needed to modulate the pulse train so that the impulse radio system can actually communicate information. The additional processing also smooths the energy distribution in the frequency domain so that impulse radio transmissions (e.g., signals) interfere minimally with conventional radio systems.

II.3 Modulation

Figure 3:
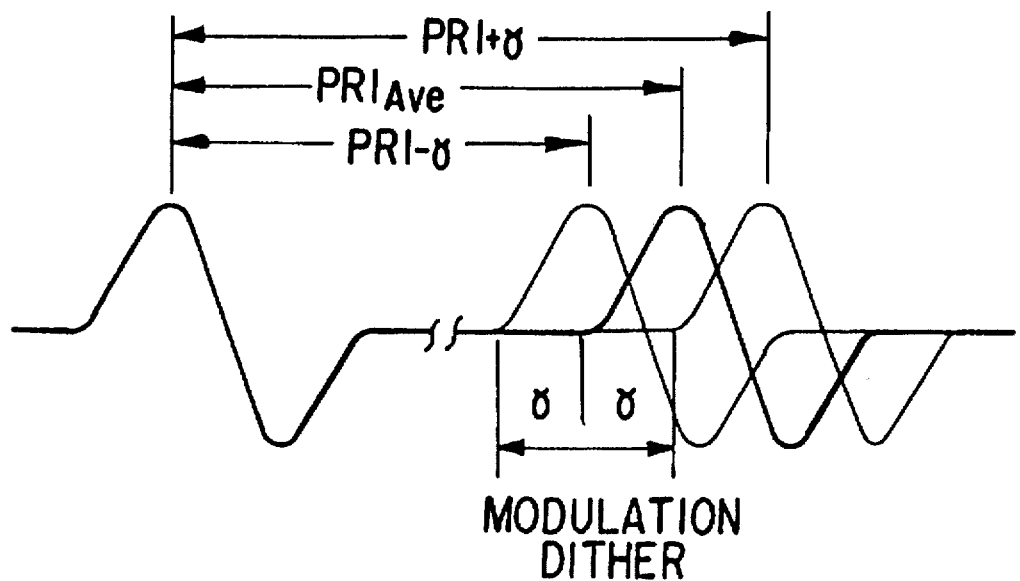
FIG. 3 illustrates a modulating signal that changes the pulse repetition interval (PRI) in proportion to the modulation in accordance with the present invention.

Amplitude and frequency/phase modulation are unsuitable for this particular form of impulse communications; the only suitable choice is pulse position modulation, which allows the use of a matched filter (i.e., cross correlator) in the receiver. As illustrated in FIG. 3, a modulating signal changes the pulse repetition interval (PRI) in proportion to the modulation.

If the modulating signal were to have three levels, the first level might shift the generation of the pulse forward in time from the nominal by δ picoseconds (ps); the second level might not shift the pulse position in time from the nominal at all; and the third level might delay the pulse by δ ps. This would be a digital modulation scheme. Analog modulation would allow continuous deviations between PRI-δ and PRI+δ. In the impulse radio system the maximum value of v is t/4, where t=time of the pulse.

In the frequency domain, pulse position modulation distributes the energy over more frequencies. For example, in the case of a 1 mpps system if the modulation dither (d) were 100 ps, the PRI is 1,000,000 Hertz (Hz) and the additional frequency components are: 999,800.04 Hz, 999,900.01 Hz, 1,000,100.01 Hz, and 1,000,200.04 Hz. (Dither is an impulse radio communications term for moving the position of a pulse in time.) Transmitted energy is now distributed among more spikes (comb lines) in the frequency domain. If the total transmitted energy remains constant, the energy in each frequency spike decreases as the number of possible pulse positions increases, thus, in the frequency domain, the energy is more smoothly distributed.

II.4 Coding for Energy Smoothing and Channelization

Because the receiver is a cross correlator, the amount of time position modulation required for one-hundred percent modulation is calculated by the inverse of $f_c/4$ (where $f_c$ is the center frequency). For a monocycle with a center frequency of 1.3 GHz, for example, this corresponds to ±157 (ps) of time position modulation. The spectrum-smoothing effects at this level of time dither is negligible.

Figure 4:
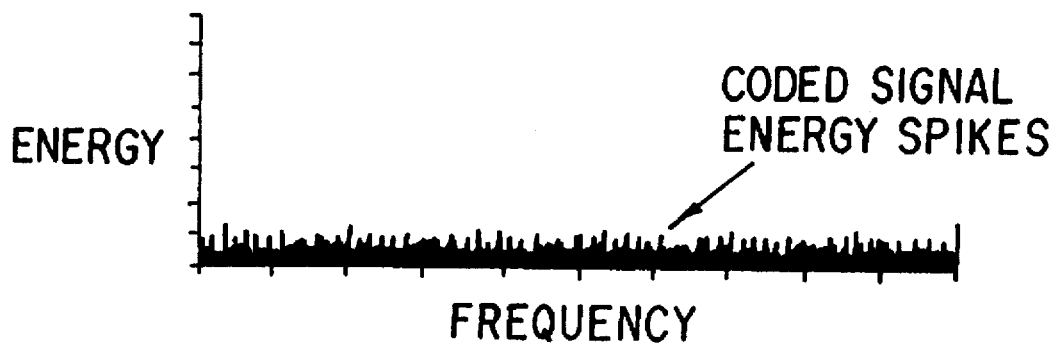
FIG. 4 is a plot illustrating the impact of pseudo-random dither on energy distribution in the frequency domain in accordance with the present invention.

Impulse radio achieves optimal smoothing by applying to each pulse a PN code dither with a much larger magnitude than the modulation dither. FIG. 4 is a plot illustrating the impact of pseudo-random dither on energy distribution in the frequency domain. FIG. 4, when compared to FIG. 2B, shows the impact of using a 256 position PN code relative to an uncoded signal.

PN dithering also provides for channelization (channelization is a procedure employed to divide a communications path into a number of channels). In an uncoded system, differentiating between separate transmitters would be very hard. PN codes create channels, if the codes themselves are relatively orthogonal (i.e., there is low correlation and/or interference between the codes being used).

II.5 Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Fortunately, implementations of an impulse radio according to the present invention do not depend on receiving every pulse. The impulse radio receiver performs a correlating, synchronous receiving function (at the RF level) that uses a statistical sampling of many pulses to recover the transmitted information.

Impulse radio receivers typically integrate 200 or more pulses to yield the demodulated output. The optimal number of pulses over which the receiver integrates is dependent on a number of variables, including pulse rate, bit rate, jamming levels, and range.

II.6 Jam Resistance

Besides channelization and energy smoothing, the PN coding also makes impulse radio highly resistant to jamming from all radio communications systems, including other impulse radio transmitters. This is critical as any other signals within the band occupied by an impulse signal act as a jammer to the impulse radio. Since there are no unallocated 1+ GHz bands available for impulse systems, they must share spectrum with other conventional and impulse radios without being adversely affected. The PN code helps impulse systems discriminate between the intended impulse transmission and transmissions from others.

Figures 5A, 5B, 5C:
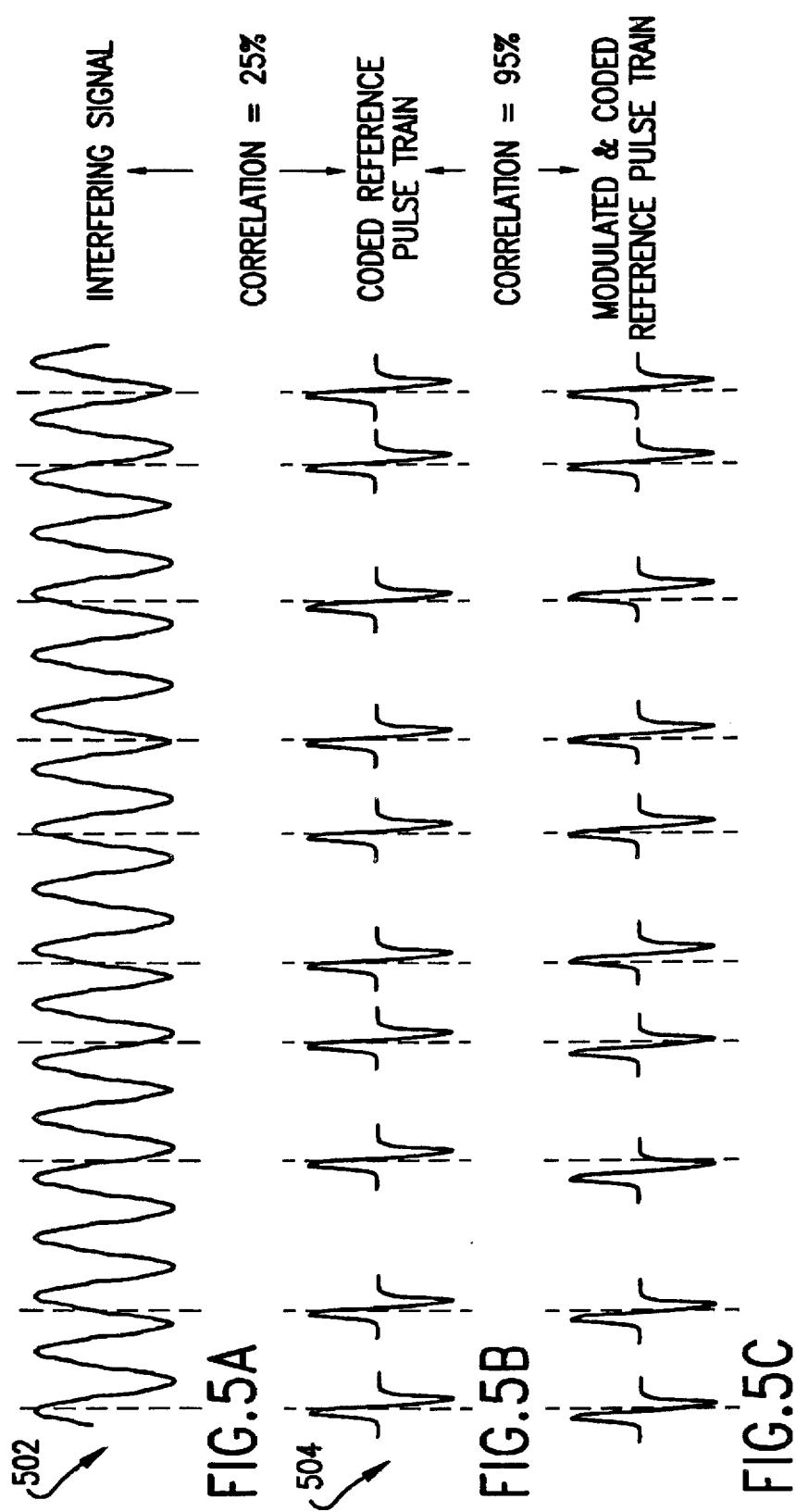
FIGS. 5A, 5B and 5C illustrates the result of a narrowband sinusoidal (interference) signal overlaying an impulse radio signal in accordance with the present invention.

FIGS. 5A–5C illustrate illustrates the result of a narrowband sinusoidal jamming (interference) signal 502 overlaying an impulse radio signal 504. At the impulse radio receiver, the input to the cross correlator would include that narrowband signal 502, as well as the received ultrawideband impulse radio signal 504. Without PN coding, the cross correlator would sample the jamming signal 502 with such regularity that the jamming signals could cause significant interference to the impulse radio receiver. However, when the transmitted impulse signal is encoded with the PN code dither (and the impulse radio receiver is synchronized with that identical PN code dither) it samples the jamming signals randomly. According to the present invention, Integrating over many pulses negates the impact of jamming.

In statistical terms, the pseudo-randomization in time of the receive process creates a stream of randomly distributed values with a mean of zero (for jamming signals). All that is necessary to eliminate the impact of jammers is to sample over enough pulses (i.e., integrate over a sufficiently large number of pulses) to drive the impact of the jamming signals to zero.

II.7 Processing Gain

Impulse radio is jam resistant because of its large processing gain. For spread spectrum systems, the definition of processing gain, which quantifies the decrease in channel interference when wide-band communications are used, is the ratio of the bandwidth of the channel to the bandwidth of the information signal. For example, a direct sequence spread spectrum system with a 10 kHz information bandwidth and a 16 MHz channel bandwidth yields a processing gain of 1600 or 32 dB. However, far greater processing gains are achieved with impulse radio systems where for the same 10 kHz information bandwidth and a 2 GHz channel bandwidth the processing gain is 200,000 or 53 dB.

The duty cycle (e.g., of 0.5%) yields a process gain of 28.3 dB. (The process gain is generally the ratio of the bandwidth of a received signal to the bandwidth of the received information signal.) The effective oversampling from integrating over multiple pulses to recover the information (e.g., integrating over 200 pulses) yields a process gain of 28.3 dB. Thus, a 2 GHz divided by a 10 mpps link transmitting 50 kilobits per second (kbps) would have a process gain of 49 dB, (i.e., 0.5 ns pulse width divided by a 100 ns pulse repetition interval would have a 0.5% duty cycle, and 10 mpps divided by a 50,000 bps would have 200 pulses per bit.)

II.8 Capacity

Theoretical analyses suggests that impulse radio systems can have thousands of voice channels per cell. To understand the capacity of an impulse radio system one must carefully examine the performance of the cross correlator. FIGS. 6A and 6B show the "cross correlator transfer function" 602. This represents the output value of an impulse radio receiver cross correlator for any given received pulse. As illustrated at 604, the cross correlator's output is 0 volts when pulses arrive outside of a cross correlation window 606. As a received pulse 608 slides through the window, the cross correlator output varies. It is at its maximum (e.g., 1 volt) when the pulse is τ/4 ahead of the center of the window (as shown at 610), 0 volts when centered in the window (as shown at 612); and at its minimum (e.g., −1 volt) when it is τ/4 after the center.

When the system is synchronized with the intended transmitter, the cross correlator's output has a swing of between ±1 volt (as a function of the transmitter's modulation). Other in-band transmission would cause a variance to the cross correlator's output value. This variance is a random variable and can be modelled as a Gaussian white noise signal with a mean value of 0. As the number of interferers increases the variance increases linearly. By integrating over a large number of pulses, the receiver develops an estimate of the transmitted signal's modulation value. Thus, the:

$$\text{Variance of the Estimate} = \frac{N\sigma}{\sqrt{Z}} \qquad (6)$$

Where N=number of interferers, σ is the variance of all the interferers to a single cross correlation, and Z is the number of pulses over which the receiver integrates to recover the modulation.

This is a good relationship for a communications system for as the number of simultaneous users increases, the link quality degrades gradually (rather than suddenly).

II.9 Multipath and Propagation

Multipath fading, the bane of sinusoidal systems, is much less of a problem (i.e., orders of magnitude less) for impulse systems than for conventional radio systems. In fact, Rayleigh fading, so noticeable in cellular communications, is a continuous wave phenomenon, not an impulse communications phenomenon.

In an impulse radio system in order for there to be multipath effects, special conditions must persist. The path length traveled by the scattered pulse must be less than the pulse's width times the speed of light, and/or successively emitted pulses at the transmitter (in the sequence) arrive at the receiver at the same time.

For the former with a one nanosecond pulse, that equals 0.3 meters or about 1 foot (i.e., 1 ns×300,000,000 meters/second). (See FIGS. 7A and 7B, in the case where the pulse traveling "Path 1" arrives one half a pulse width after the direct path pulse.)

For the latter with a 1 megapulse per second system that would be equal to traveling an extra 300, 600, 900, etc. meters. However, because each individual pulse is subject to the pseudo-random dither, these pulses are decorrelated.

Figure 7B:
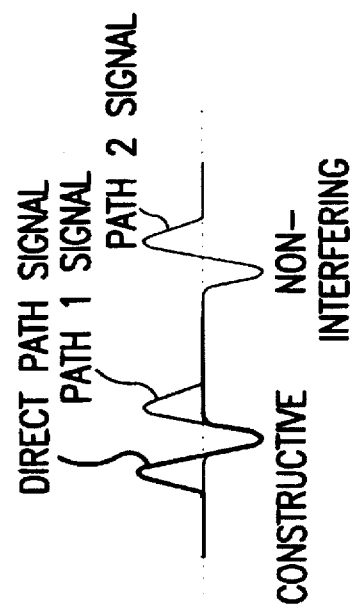
FIGS. 7A and 7B illustrates impulse radio multipath effects in accordance with the present invention.
Figure 7A:
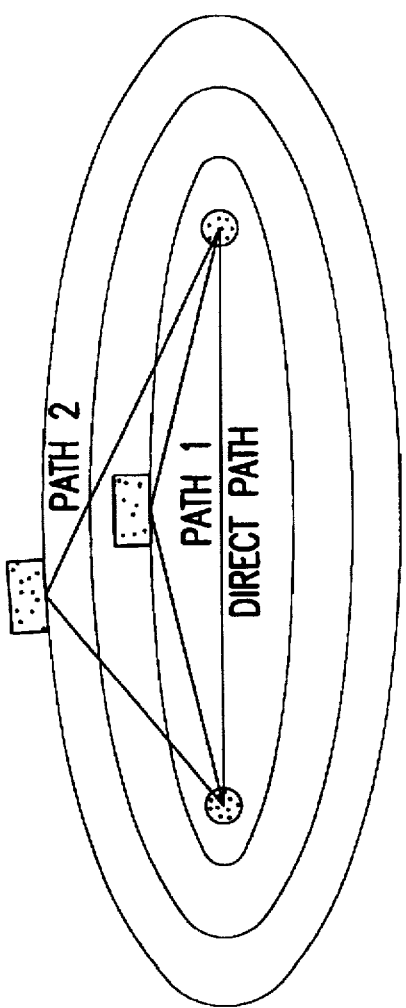

Pulses traveling between these intervals do not cause self-interference (in FIGS. 7A and 7B, this is illustrated by the pulse traveling Path 2). While pulses traveling grazing paths, as illustrated in FIGS. 7A and 7B by the narrowest ellipsoid, create impulse radio multipath effects.

As illustrated in FIGS. 8A–8D at 802, if the multipath pulse travels one half width of a pulse width further, it increases the power level of the received signal (the phase of the multipath pulse will be inverted by the reflecting surface). If the pulse travels less than one half a pulse width further it will create destructive interference, as shown at 804. For a 1 ns pulse, for example, destructive interference will occur if the multipath pulse travels between 0 and 15 cm (0 and 6 inches).

Tests of impulse radio systems (including impulse radar tests) suggest that multipath will not present any major problems in actual operation. Additionally, shorter pulse widths are also envisioned, which will further reduce the probability of destructive interference (because the reflected path length required for destructive interference will be shortened).

III. The Subcarrier Invention

This section is directed to the use of subcarriers for impulse radio communication systems. This section includes subsections relating to the theory of operation of subcarriers for the impulse radio transmitter and receiver. The description is sectioned to describe a one channel embodiment with improvement over baseband alone and a two or more subcarrier channel embodiment.

III.1 Theory of Operation

According to the present invention, impulse radio has been developed to include one or more subcarriers for added channelization, smoothing and fidelity. The following ultrawide-band time domain impulse radio communication architectures operate according to the general impulse radio theories discussed above in section II. The following three specific embodiments will be described: a one channel system, a two channel system and a three or more channel system.

The three impulse radio receiver embodiments set forth below are used by way of example, not limitation, to describe the present invention and enable those skilled in the relevant arts to make and use the invention. These arts include at least the fields of communications, discrete analog, digital and integrated circuit design and implementation, digital signal processing and PN code theory. The implementation of various elements and blocks will become evident to those skilled in the pertinent art.

III.2 One Channel with Improvement over Baseband Alone

This section describes an impulse radio communications architecture using one subcarrier channel that has improved performance over baseband alone. The radio frequency (RF) embodiments of the present invention are the most common. Typical RF impulse radio system applications include cellular telephones, wireless telephones, wireless PBXs/Local area networks, and the like.

Propagation, which is defined as the process by which a signal proceeds from a transmitter to a receiver, of RF impulse radio signals is typically through air or space from a transmit antenna to a receive antenna. This is considered wireless RF impulse radio. The preferred antennas for impulse radio are fully described in U.S. Pat. No. 5,363,108.

However, the present invention is also suitable for transmission through coaxial cable. In this embodiment, the transmit and receive antennas are eliminated.

A representative block diagram of an impulse radio electrical system using one subcarrier channel is shown in FIG. 9. A transmitter 901 and a receiver 903 employing a single subcarrier ultrawide-band impulse radio channel are depicted. The transmitter 901 and the receiver 903 are separated by a propagation medium 905, such as air, space, or other medium cable of propagating ultrawide-band signals. Transmitted impulse radio signals 907 propagate through the propagation medium 905 from the transmitter 901 to the receiver 903.

III.2.a. Transmitter

A preferred embodiment of an impulse radio transmitter 901 of an impulse radio communication system having one subcarrier channel will now be described with reference to FIG. 10.

The transmitter 901 comprises a time base 1002 that generates a periodic timing signal 1004. The time base 1002 comprises a voltage controlled oscillator, or the like, having a high timing accuracy on the order of picoseconds. The voltage control to adjust the VCO center frequency is set at calibration the desired center frequency used to define the transmitter's non-divided pulse repetition rate. The periodic timing signal 1004 is supplied to a code source 1006 and to a code time modulator 1008.

The code source 1006 comprises a storage device such as a random access memory (RAM), read only memory (ROM), or the like, for storing orthogonal PN codes and for outputting the PN codes as a code signal 1010. Alternatively, maximum length shift registers can be used to generate the PN codes. Code source 1006 monitors the periodic timing signal 1004 to permit the code signal 1010 to be synchronized to the code time modulator 1008. The code time modulator 1008 uses the code signal 1010 to modulate the periodic timing signal 1004 for channelization and smoothing of a final emitted signal 1012. The output of the code time modulator 1008 is called coded timing signal 1014.

The coded timing signal 1014 is supplied to a subcarrier time modulator 1016 for information modulation thereof. In prior impulse systems, the information modulation was done by using the information itself as the modulating source. In the present invention, however, an information source 1018 supplies an information signal 1020 to a subcarrier generator and modulator 1022. The information signal 1020 can be any type of intelligence, including digital bits representing voice, data, imagery, or the like, analog signals, or complex signals. Both the coded timing signal 1014 and the subcarrier time modulator 1016 can be implemented using voltage, current or digital sources as modulation inputs, as would be apparent to a person skilled in the relevant art.

As defined by Dixon, a subcarrier is "a carrier, modulated with information separate from carrier modulation, which in turn modulates a carrier." The subcarrier generator and modulator 1022 of the present invention generates a modulated subcarrier signal 1024 which is modulated by the information signal 1020, and supplies the modulated subcarrier signal 1024 to the subcarrier time modulator 1016.

Thus, the modulated subcarrier signal 1024 is used by the subcarrier time modulator 1016 to modulate the carrier, which in this case is the coded timing signal 1014. Modulation of the coded timing signal 1014 by the subcarrier time modulator 1016 generates a modulated, coded timing signal 1026 that is sent to an output stage 1028.

The output stage 1028 uses the modulated, coded timing signal 1026 as a trigger to generate electrical monocycle pulses. The electrical monocycle pulses are sent to a transmit antenna 1030 via a transmission line 1032 coupled thereto. The electrical monocycle pulses are converted into propagating electromagnetic pulses by the transmit antenna 1030. In the present embodiment, the electromagnetic pulses are called the emitted signal 1012, and propagate to an impulse radio receiver (not shown) through a propagation medium 905, such as air in a radio frequency embodiment. In the preferred embodiment, the emitted signal(s) 1012 is wideband or ultrawide-band signals. However, the emitted signal (s) 1012 can be spectrally modified by filtering of the monocycle pulses. This bandpass filtering will cause each monocycle pulse to have more zero crossings in the time domain. In this case, the impulse radio receiver must use a similar waveform in the cross correlator to be efficient.

The addition of the subcarrier generation and modulation "stage" 1022 to the impulse radio transmitter 901 has many benefits. The subcarrier modulated by the information signal provides additional channelization and smoothing to the system permitting the addition of many new, distinct impulse radio channels. The addition of subcarriers also provides added fidelity in the form of more bandwidth and better signal-to-noise to the information signal 1020, compared to baseband modulation alone.

The use of a subcarrier for impulse radios also improves harmonic distortion due to a non-linear modulation transfer function, compared to baseband modulation. The nonlinear modulation transfer function is described below in connection with the cross correlation process performed by the impulse radio receiver.

Because impulse radio is not a CW carrier-based system, the use of a subcarrier is an elegant, counter intuitive addition to the time domain impulse radio design. Signal-to-noise is improved by 5–20 dB (depending on signal-to-noise of the narrow pulse modulated carrier) compared to non-subcarrier impulse radio transmissions.

Using a subcarrier in an impulse radio translates (or shifts) the baseband signals to a higher frequency. In a preferred embodiment, the subcarrier generation and modulator 1022 generates a signal that is modulated by the information signal 1020 by frequency modulation (FM) techniques, amplitude modulation (AM), phase modulation, frequency shift keying (FSK), phase shift keying (PSK), pulsed FM, or the like. In another embodiment, direct digital modulation is employed as a subcarrier technique. In this alternate embodiment, Manchester encoding of digital data produces a digital modulated subcarrier signal 1024. The subcarrier time modulator 1016 uses the modulated subcarrier 1024 to pulse position modulate the coded timing signal 1014.

Other non-sinusoidal and/or non-continuous waveforms can also be employed as subcarriers in connection with the present invention. The modulated subcarrier signal 1024 is used by the subcarrier time modulator 1016 to time shift the position of the pulses of the coded timing signal 1014. Thus, the signal that triggers the output stage (in this case the modulated, coded timing signal 1026) is a train of pulse position modulated pulses.

Subcarriers of different frequencies or waveforms can be used to add channelization of impulse radio signals. Thus, an impulse radio link can communicate many independent channels simultaneously by employing different subcarriers for each channel.

To illustrate this, consider two separate pairs of impulse radio users operating with the same PN codes. A first pair of users communicate with impulse radios having the subcarrier generator/modulators 1022 generating one sine wave subcarrier of a first discrete frequency. A second pair of users communicate with separate impulse radios having the subcarrier generator/modulator 1022 generating one sine wave subcarrier of a second discrete frequency, separate from the first frequency. Each user pair can have isolated communications from the other by configuring the impulse radio receivers of the two pairs (as discussed below) to reproduce only the information conveyed by the appropriate subcarrier frequency. In view of this illustration, many additional impulse radio channels are available by using the impulse radio subcarrier technique.

Alternatively, the two pairs of impulse radio users could have isolated communications if each pair used different PN codes and the same subcarriers. Additionally, channelization can be achieved by having sets of radios operate at different pulse repetition rates, independent of PN codes and/or subcarriers.

A result of the novel subcarrier stage is enhanced fidelity of the information channel. This benefit is attributed to the fact that the subcarrier inherently renders the information more impervious to noise. As is described in detail below in section III.2.(b), at the impulse radio receiver a template signal having a waveform designed to match the received monocycle pulses is generated. The template signal is positioned in time according to the known PN code of the transmitter and is then cross correlated with the received impulse radio signal. The cross correlation output is integrated to recover the impulse radio signal out of the noise. Once retrieved in this manner, the signal is demodulated to remove the subcarrier and yield the information signal.

Figure 11:
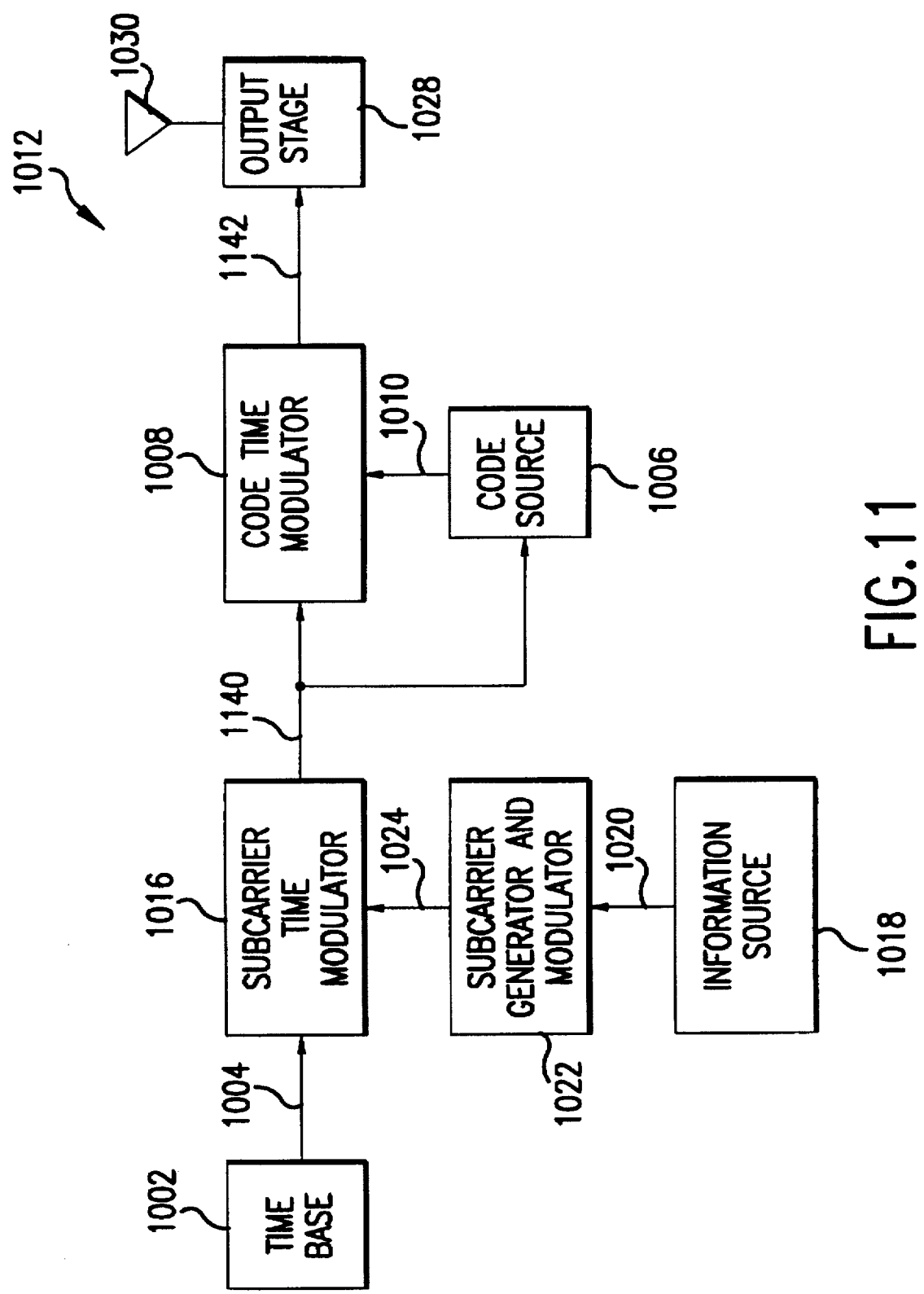
FIG. 11 shows another embodiment of the impulse radio transmitter in accordance with the present invention.

Another embodiment of the impulse radio transmitter according to the present invention is shown in FIG. 11. In this embodiment, the positions of code time modulator 1008 and the subcarrier time modulator 1016 are reversed. As shown in FIG. 11, the information source 1018 outputs the information signal 1020 to the subcarrier generator and modulator 1022. In turn, the subcarrier generator and modulator 1022 outputs the modulated subcarrier signal 1024 to the subcarrier time modulator 1016. The subcarrier time modulator 1016 uses the modulated subcarrier signal 1024 to time position modulate the periodic timing signal 1004 to generate a modulated timing signal 1140. Any of the subcarrier modulation techniques described above in connection with FIG. 10 can be used.

The code source 1006 receives the periodic timing signal 1004 for synchronization and outputs the code signal 1010 to the code time modulator 1008. The code time modulator 1008 uses the code signal 1010 to further time-position modulate the modulated timing signal 1140 to output a modulated, coded timing signal 1142. In a similar manner as the embodiment shown in FIG. 10, the modulated, coded timing signal 1142 shown in FIG. 11 is provided to the output stage 1028. As described above in connection with FIG. 10, the impulse radio transmitter then outputs an emitted signal 1012.

The above description of FIG. 11 is exemplary of the many modifications that can be made to the impulse radio transmitter to provide the necessary coding and subcarrier modulation of the signals to be transmitted via the impulse radio transmitter. The above embodiments described in connection with FIGS. 10 and 11 have been provided by way of example, not limitation. Similar arrangements of the blocks in FIGS. 10 and 11 of the impulse radio transmitter would be apparent to a person skilled in the relevant art based on the above disclosure without departing from the scope of the invention.

Figure 12:
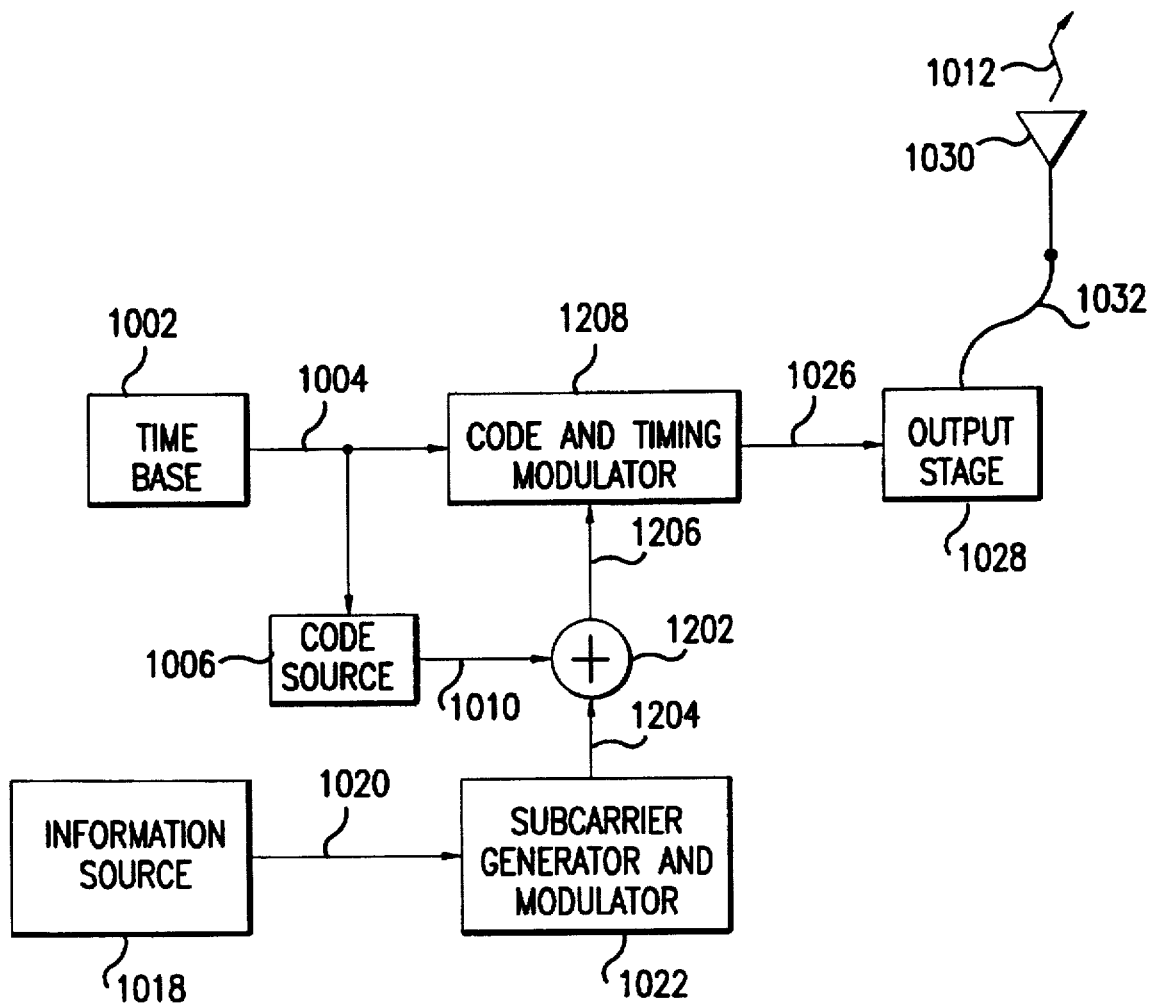
FIG. 12 shows another transmitter embodiment in accordance with the present invention.

Another transmitter embodiment is shown in FIG. 12. In this embodiment, a summer 1202, or the like, is used to sum the code signal 1010 and an information modulated subcarrier signal 1204. The summer 1202 outputs a code modulated subcarrier signal 1206 to a code and timing modulator 1208. The code and time modulator 1208 performs the functions of the code time modulator and the subcarrier time modulator 1016 of FIG. 10. The code and timing modulator 1208 uses the code modulated subcarrier signal 1206 to modulate the periodic timing signal 1004 and thus produce the modulated, coded timing signal 1026. The remaining elements of the receiver of FIG. 12 operate as discussed in connection with FIG. 10. Any of the subcarrier modulation techniques described above in connection with FIG. 10 can be used.

Figure 13:
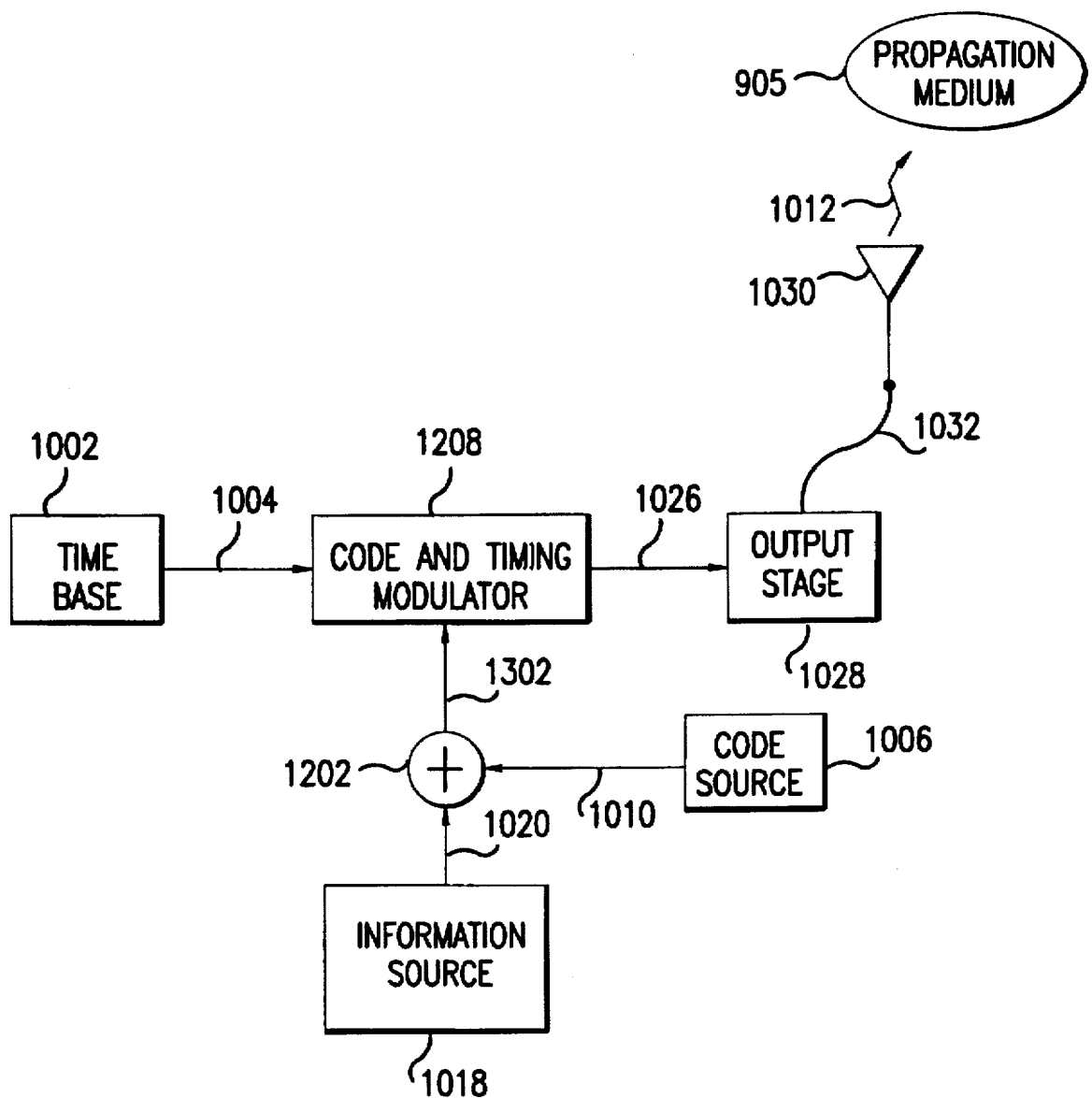
FIG. 13 shows a still further alternate embodiment in accordance with the present invention.

In a still further alternate embodiment, modulation can be done using the information signal 1020 to directly modulate the code signal 1010. This is illustrated in FIG. 13. Summer 1202 is configured to modulate (sum) the code signal 1010 with the information signal 1020 to thereby generate a modulation signal 1302. A code and timing modulator 1208 uses the modulation signal 1302 to modulate the periodic timing signal 1004 and produce the modulated, coded timing signal 1026. The remaining elements of the receiver in FIG. 13 operate as discussed in connection with FIG. 10.

A subcarrier not modulated with information can also be used to modulate the coded timing signal, or the coded timing signal itself can be transmitted without any modulation. These two latter embodiments can be used to communicate the mere presence of an impulse radio like a beacon or a transponder. Different impulse radio units can be assigned different PN codes and different subcarriers to realize many operational applications.

III.2.b. Receiver

An impulse radio receiver 903 for a the single channel subcarrier impulse radio communication system is now described with reference to FIG. 14.

An impulse radio receiver (hereafter called the receiver) 1400 comprises a receive antenna 1402 for receiving a propagated impulse radio signal 1404. A received signal 1406 is input to a cross correlator 1408 via a receiver transmission line 1410, coupled to the receive antenna 1402.

The receiver 1400 also comprises a decode source 1410 and an adjustable time base 1414. The decode source 1410 generates a decode control signal 1412 corresponding to the PN code used by the associated impulse radio transmitter (not shown) that transmitted the propagated signal 1404. The adjustable time base 1414 generates a periodic timing signal 1416 that comprises a train of template signal pulses having waveforms substantially equivalent to each pulse of the received signal 1406. Each pulse of the received signal 1406 resembles the derivative of a Gaussian monocycle pulse.

FIG. 15 shows a representative plot of a pulse 1502 corresponding to the received signal 1406 in connection with the receiver 1400. The pulse 1502 corresponds to an emitted signal (monocycle pulse) having a waveform like pulse 302 of FIG. 3. When an electromagnetic monocycle pulse having a waveform like pulse 302 is incident to the receive antenna 1402, the receive antenna has an inherent characteristic that causes the resulting electrical waveform at its output to have the shape of pulse 1502. If the impulse radio antenna is inverted, pulse 1502 will be voltage inverted.

Figure 16A:
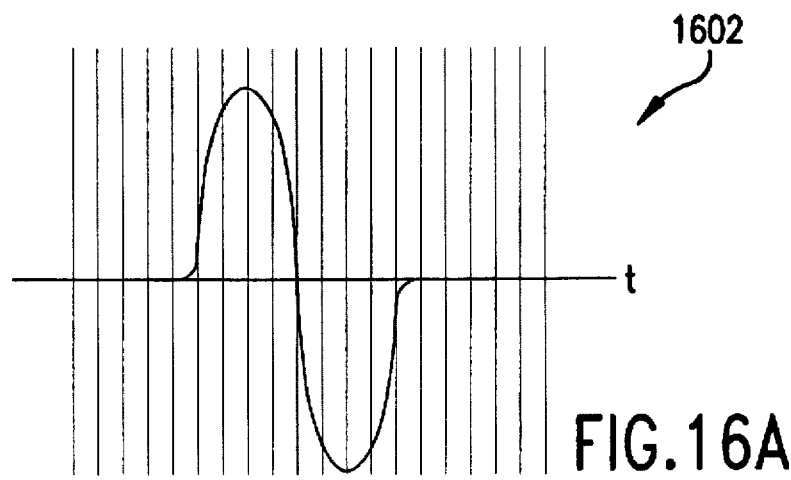
FIGS. 16A, 16B and 16C illustrates the cross correlation process in accordance with the present invention.
Figure 16B:
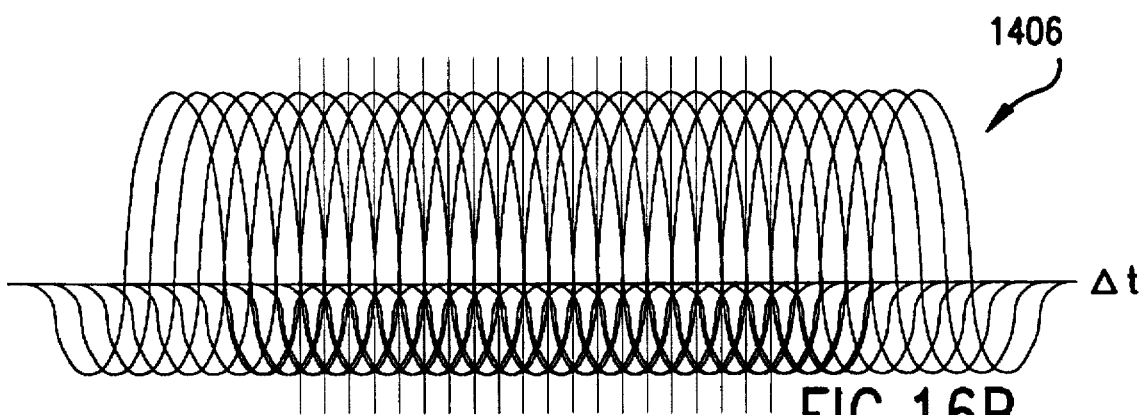
Figure 16C:
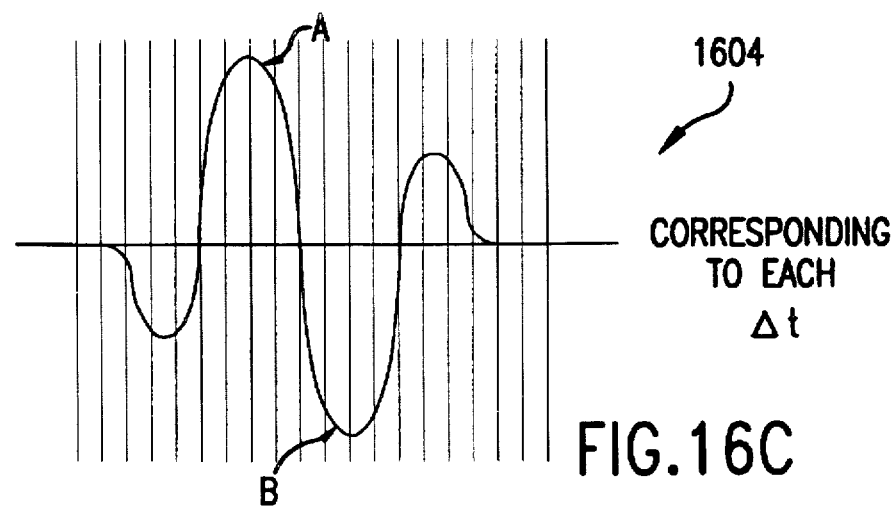

FIGS. 16A–16C illustrate the cross correlation process. FIGS. 16A–16C show the waveform of a template signal pulse 1602 and a waveform of a received (impulse radio pulse) signal 1406 at time increments of Δt. A curve 1604 is not a continuous waveform, but represents resulting correlation voltages at each Δt time alignment as the received signal 1406 slides by the template signal pulse 1602 out of lock. (Note that each Δt of the received signal 1406 is voltage inverted when compared to the pulse 1502.) The time positioning of the template signal pulse used to correlate with the received signal 1406 is established by a decode timing modulator 1418.

The effect of using the cross correlation function for the modulation transfer function is to cause the output of the receiver to be a non-linear function of the amplitude of the input. For baseband modulation, this is undesirable. However, for subcarriers, such as FM, PSK, FSK and manchester, the harmonics can easily be filtered thereby eliminating any distortion. Such filtering can not remove harmonics when baseband modulation is used, because the harmonics stay at baseband, and thus the signal is irrecoverable.

Turning again to FIG. 14, the decode control signal 1412 and periodic timing signal 1416 are received by the decode timing modulator 1418. The decode timing modulator 1418 uses the decode control signal 1412 to position in time the periodic timing signal 1416 to generate a decode signal 1420. The decode signal 1420 is thus matched in time to the known PN code of the transmitter so that the received signal 1406 can be detected in the cross correlator 1408.

The detection process performed by the cross correlator 1408 comprises a cross correlation operation of the received signal 1406 with the decode signal 1420. Integration over time of the cross correlation generates a baseband signal 1422. As discussed above in section II.A, integration over time of the cross correlated signal pulls the impulse radio signals out of the noise.

In the present embodiment, the baseband signal 1422 is demodulated by a subcarrier demodulator 1424 to remove the subcarrier and yield a demodulated information signal 1426. The demodulated information signal 1426 is substantially identical to the information signal of the transmitter (see 1018 of FIG. 10).

The baseband signal 1422 is also input to a lowpass filter 1428. A control loop 1429 comprising the lowpass filter 1428 is used to generate an error signal 1430 to provide minor phase adjustments to the adjustable time base 1414 to time position the periodic timing signal 1416 in relation to the position of the received signal, 1406.

The subcarrier embodiments provide less signal compression, and lower signal distortion by reducing baseband noise for high reliability voice, data and/or imagery communications. The linearity requirements for the modulation using the cross correlator are greatly relaxed by using the subcarrier technique of the present invention. Modulation transfer characteristics have to be extremely linear in order to successfully transfer low distortion speech or music. This is very difficult to achieve in a non-subcarrier baseband impulse system.

Information signals are easily corrupted by noise. Most of the noise concentrates at the baseband and then decreases with higher and higher frequencies, up to the Nyquest frequency. For example, in an impulse radio using a 1.4 megapulse per second rate, the Nyquest frequency would be about 700 kHz. In this example, a subcarrier up to about 700 kHz can be used to render the impulse radio system substantially impervious to noise.

In an FM subcarrier embodiment, a phase-locked loop (PLL) frequency demodulator is used. The characteristics of the phase-locked loop determine the bandwidth capture and other basic aspects of the received signal. An optional bandpass filter can be used in series before the phase-locked loop to narrow the spectrum of demodulation performed by the phase-locked loop.

III.3 Two or More Subcarrier Channels (e.g., voice, digital data and control information)

A major advantage of the present subcarrier impulse radio is that multiple subcarriers can be packed on the same coded timing signal for simultaneous transmission. An example of three subcarriers on one impulse radio ultrawide-band transmission is illustrated for both analog and digital implementations in FIGS. 17–19.

Figure 17:
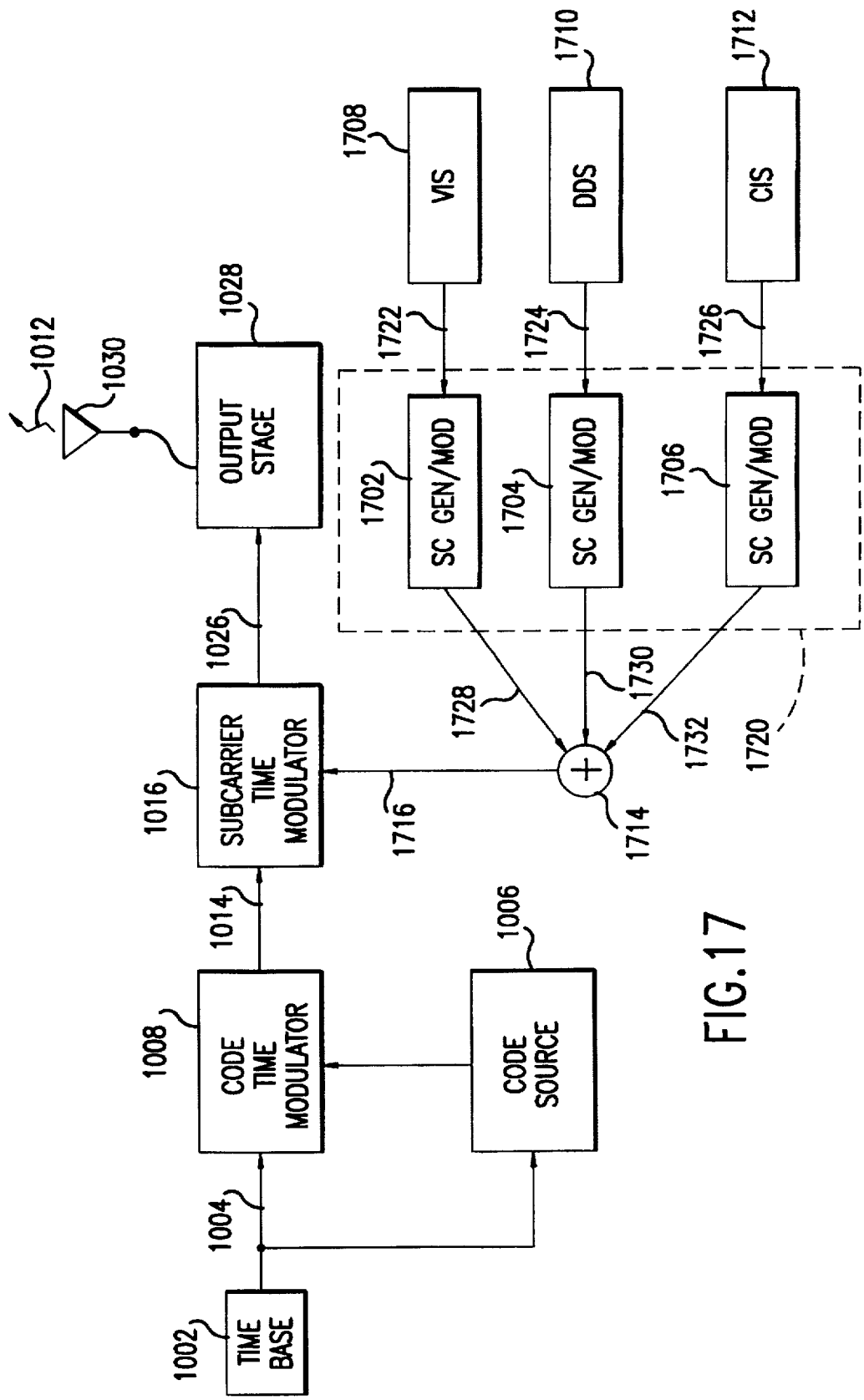
FIG. 17 shows a representative illustration of an impulse radio transmitter having three subcarrier generator/modulators in accordance with the present invention.

FIG. 17 shows a representative illustration of an impulse radio transmitter having three subcarrier generator/modulators (SC GEN/MOD) 1702, 1704 and 1706, each having a different subcarrier frequency. The basic architecture of the transmitter is based on the embodiment of FIG. 10. For example, a main subcarrier generator/modulator 1720 (shown as a dashed box) is analogous to subcarrier generator/modulator 1022. However, this example can be modified to operate with any of the above disclosed transmitters and their equivalents.

A voice information source (VIS) 1708 is fed to a subcarrier generator/modulator (abbreviated SC GEN/MOD in FIG. 17) 1702 via a line 1722 for modulation of a first subcarrier signal (not shown). The first subcarrier signal is internally generated by subcarrier generator/modulator 1702, or is externally generated and supplied as an input to subcarrier generator/modulator 1720.

Similarly, a digital data source (DDS) 1710, such as a modem output or facsimile transmission, is fed to a second subcarrier generator/modulator (abbreviated SC GEN/MOD in FIG. 17) 1704, via a line (or bus) 1724, for modulation of second subcarrier signals. Finally, a digital control information source (CIS) 1712 is fed to a third subcarrier generator/modulator (abbreviated SC GEN/MOD in FIG. 17) 1706, via a line (or bus) 1726, for modulation of a third subcarrier signal. The second and third subcarriers signals are generated by subcarrier generator/modulators 1704 and 1706, respectively, or they are externally supplied as inputs to subcarrier generator/modulator 1720.

The digital CIS 1712 provides control information to an impulse radio receiver. In a cellular telephone transceiver type system, such digital control information can comprise routing information, scheduling information, ring signals, or the like. Virtually any type of control signals, or for that matter, intelligence, can be used to modulate a subcarrier signal.

Three modulated subcarrier signals are output by the three subcarrier generators/modulators 1702, 1704 and 1706, via lines 1728, 1730 and 1732, and are summed at a summer 1714. A resultant signal 1716 is sent to the subcarrier time modulator 1016, where it is used to modulate the coded timing signal 1014 to generate modulated, coded timing signal 1026. The modulated, coded timing signal 1026 output by the subcarrier time modulator 1016 is fed to the output stage 1028 and transmitted as an emitted signal 1012 as described above.

Figure 18:
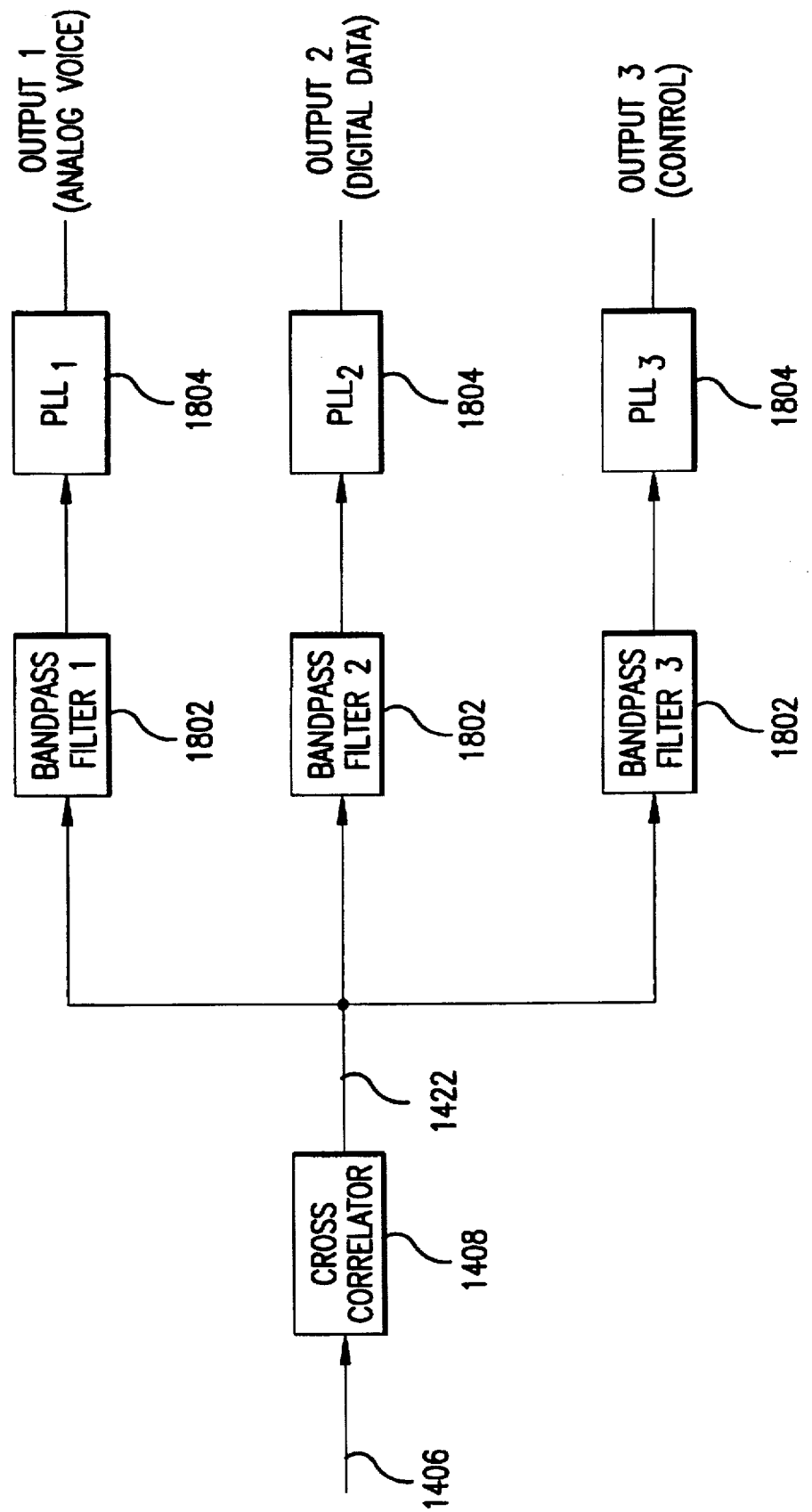
FIG. 18 is a representative analog embodiment showing the cross correlator followed by plural analog FM demodulation branches in accordance with the present invention.
Figure 19:
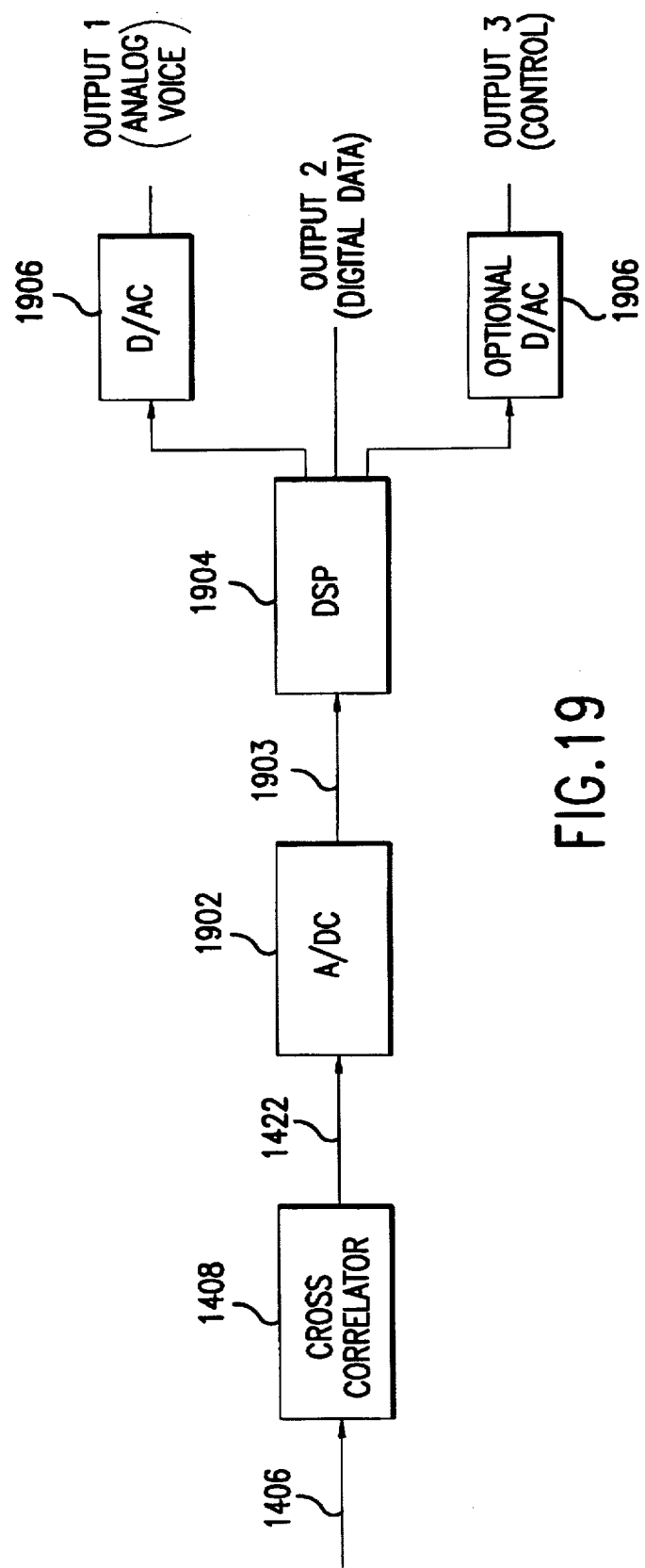
FIG. 19 shows a digital embodiment in accordance with the present invention.

Two representative plural subcarrier channel impulse radio receivers are shown in FIGS. 18 and 19. Each receiver has components for demodulating the three subcarrier channels transmitted by the transmitter of FIG. 17, for example. The basic architecture of the receivers in FIGS. 18 and 19 is based on the embodiment of FIG. 14, or its equivalents.

FIG. 18 is a representative analog embodiment showing the cross correlator 1408 followed by plural analog FM demodulation branches. The cross correlated baseband signal 1422 is generated from the received signal 1406, as discussed in connection with FIG. 14 (using the elements of the control loop which are not illustrated in FIGS. 18 and 19). Each branch demodulates one subcarrier using a bandpass filter 1802 (e.g., an L-C or switched capacitor filter) and a phase-locked loop block 1804. Thus, three separate, simultaneously transmitted information signals are recovered and made available at OUTPUTs 1-3.

In a digital embodiment shown at FIG. 19, the cross correlated baseband signal 1422 is converted into a digital signal using an analog-to-digital converter (A/DC) 1902. Using a digital signal processor (DSP) 1904, such as a model no. TMS320C40 DSP package (manufactured by Texas Instruments, Dallas, Tex.), or the like, and known digital signal processor algorithms using Fourier transforms or the like, the three separate subcarriers encoded in signal 1903 are digitally demodulated. The digitally demodulated information can be converted back to analog using digital-to-analog converter (D/AC) 1906. The voice signal is converted back to its analog counterpart using digital-to-analog converter 1906 and made available at OUTPUT 1. The digital data signal is output or otherwise made available directly from the digital signal processor at OUTPUT 2. Finally, the control signal is output or otherwise made available at OUTPUT 3 directly from the digital signal processor or after digital-to-analog conversion by digital-to-analog converter 1906. The addition of plural subcarriers does not affect the wide band characteristics of the impulse radio signals.

IV. The Time Modulator

This section is directed to the time modulator that is used for code time delaying, subcarrier time delaying and a combination of both. The operation and structure of several embodiments for using the time modulator for subcarrier impulse radio communications are described.

In accordance with various embodiments of the present invention, the impulse radio transmitter includes code time modulators (e.g., 1008) and subcarrier time modulators (e.g., 1016), as well as code and timing modulators (e.g., 1208). Each of these modulators functions to time delay a signal (e.g., the periodic timing signal 1004) according to information conveyed by a trigger signal (e.g., code signal 1010 or modulated subcarrier signal 1024.) Thus, each modulator (e.g., 1008, 1016 or 1208) is therefore considered a delay generator. Delay generators having numeric input signals are called binary-to-time delay generators.

Binary-to-time delay generators can be implemented using currently available commercial ICs. A preferred delay generator having a numeric input is a model MC100E196 ECL (emitter coupled logic) device manufactured by Motorola, of Schaumburg, Ill. However, in connection with the impulse radio signals according to the present invention, such conventional binary-to-time delay generators do not provide accurate time delays to permit accurate recovery of impulse radio signals at the impulse radio receiver. In other words, time delays on the order of 157 ps (picoseconds), which is a typical pulse duration of a monocycle pulse, cannot accurately be produced using conventional binary-to-time delay generators.

V. Linearization

This section is directed to linearization of the time modulator for both the impulse radio transmitter and receiver. Linearization of the time modulator permits the impulse radio transmitter and receiver to generate time delays having the necessary accuracy for impulse radio communications.

In order to solve the time delay problem described above in section IV., the inventors have performed statistical analysis of the specifications (e.g., performance curves) provided by binary-to-time delay manufacturers. Based on this work, the inventors discovered that the non-linear operational characteristics of conventional binary-to-time delay generators can be compensated for if the non-linear operational characteristics of the device are known. Thus, according to a further aspect of the present invention, the impulse radio transmitter comprises a linearization look-up read only memory (ROM) (not illustrated), in conjunction with conventional binary-to-time delay generators to compensate for any non-linearity. This permits the impulse radio transmitter to generate time delays having accuracy well below the 157 ps requirement.

Figure 20:
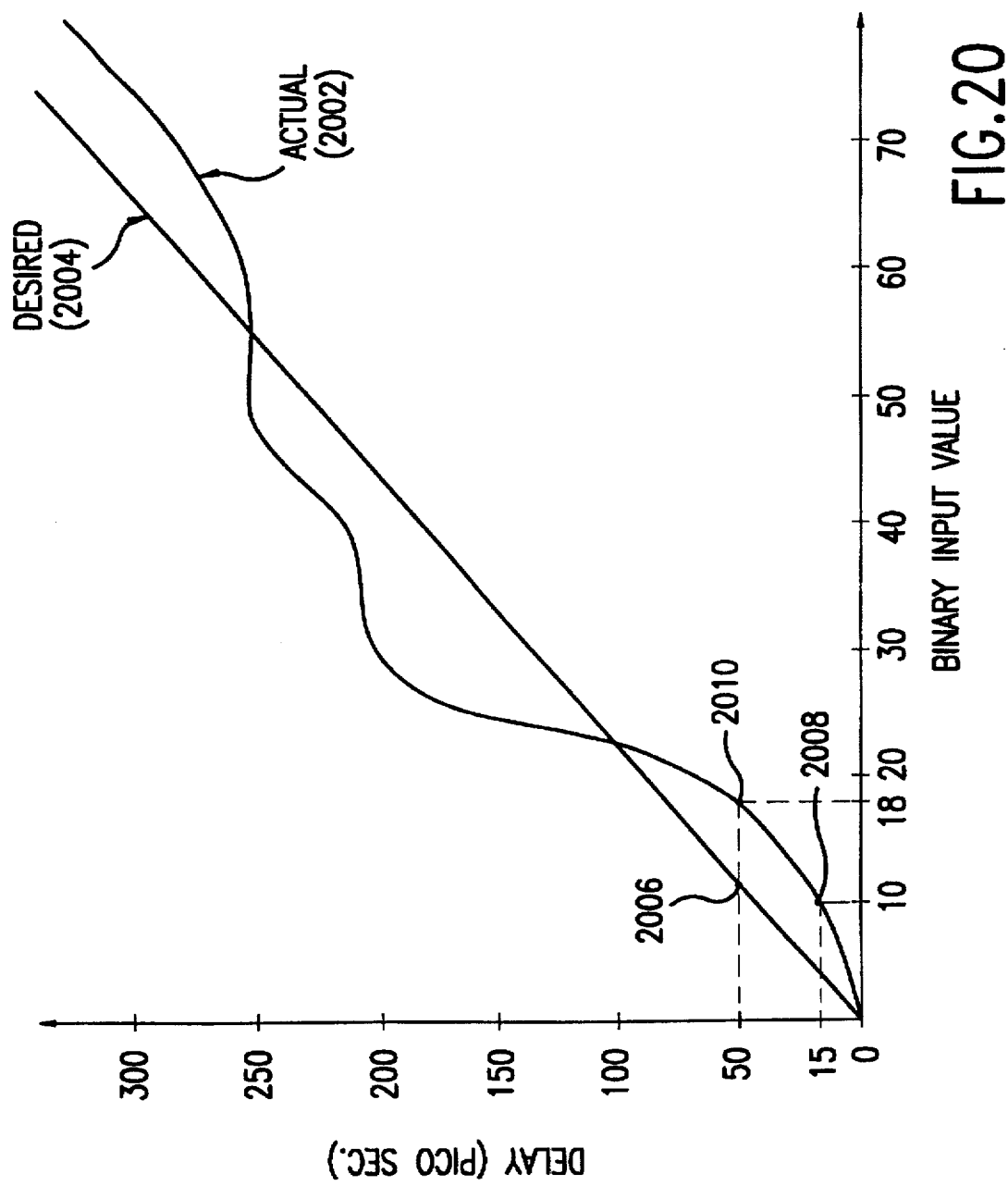
FIG. 20 is a plot showing delay time (in picoseconds) versus a binary (i.e., numeric) input value for a conventional binary-to-time delay generator in accordance with the present invention.

FIG. 20 is a plot showing delay time (in picoseconds) versus a binary (i.e., numeric) input value for a conventional binary-to-time delay generator. A curve 2002 shows an example of the actual time delay output characteristics of a conventional binary-to-time delay generator. The desired output of a binary-to-time delay generator for use with the present invention is shown at a curve 2004.

For a binary input value of 18, for example, a point 2010 on curve 2002 represents the actual output of a conventional binary-to-time delay generator. A binary input value of 10 would typically be input to produce a 157 ps time delay at the output of the conventional binary-to-time delay generator. However, given the numeric input value of 10, a conventional binary-to-time delay generator may produce an actual output value of only approximately 15 ps, rather than the desired 157 ps, as shown at a point 2006. Thus, in order to generate a 157 ps delay in this example, a numeric input value of 18 would need to be input to produce the desired delay of 157 ps, as shown at a point 2010 on the curve 2002.

Although it is generally desirable to linearize the dither generators on the transmitter and receiver, it is actually necessary only to have the same dither versus numeric input mapping linearity, not necessarily a straight line.

According to the present invention, linearization data, of the type shown in FIG. 20, is used to map the actual response of a conventional binary-to-time delay generator to a desired time delay. This linearization data, or map, is stored in a linearization read only memory (ROM).

In order to transmit 1's and 0's, pulses are time-modulated either forward or backward in time. In other words, impulse radio signals, that are intended to produce a logical value of 1 when received by the impulse radio receiver, are time positioned slightly forward by the impulse radio transmitter. Impulse radio signals that are intended to be received as logical 0's are time shifted slightly back by the impulse radio transmitter.

The cross correlator 1408 in the impulse radio receiver converts that time position into more positive or more negative voltage increments. A bandpass data filter is used to maximize the signal-to-noise ratio of the data stream. The bandwidth of this bandpass data filter is set to approximately one-half the transmission baud rate, as would be apparent to a person skilled in the relevant art. A comparator then turns those voltages into logical equivalents of 1's and 0's. It is necessary to supply a pulse for both 1's and 0's because, in the absence of a pulse, noise at the threshold of the comparator would produce a random output. The larger the separation (i.e., voltage difference) between the positive and negative information samples, the better the signal to noise ratio and the lower the bit error rate.

Because the 1's and 0's cause the signal to be time shifted, the linearization ROM must store separate linearization information for impulse radio signals for the logic 1 and separate linearization data for impulse radio signals for the logic 0. For a predetermined information (data) transmission rate, impulse radio transmission logic 1's and logic 0's must be shifted ahead and back, respectively, in time by a finite amount so that the cross correlator in the impulse radio receiver can properly distinguish logic 1's from logic 0's in the data stream.

For a chosen center frequency of the monocycle pulse of 1.3 GHz, for example, the desired shifting forward for logic 1's and shifting backward for logic 0's is a shift value of 157 ps; if the center frequency doubles, the time shift is halved. Thus, linearization ROM must store one (8 bit) digital value representing a linearized numeric value, such that when output from the linearization ROM to the code time modulator 1408, the proper 157 ps time shift can be realized. In a preferred embodiment, the linearization ROM will store one 8 bit numerical value for a forward shift of 157 ps and a second 8 bit numerical value for a backward shift of 157 ps. In order to achieve forward and backward shifts of some other time shift in addition to that of 157 ps, the linearization ROM must store further 8 bit numerical values for forward and backward time shifts. Note that if the transmitter used a modulator employing a zero time shift (nominal) and two times 157 ps for the modulation values (corresponding to digital zero and one, respectively), that this would look the same to a demodulating receiver.

V.1. Transmitter

Figure 21:
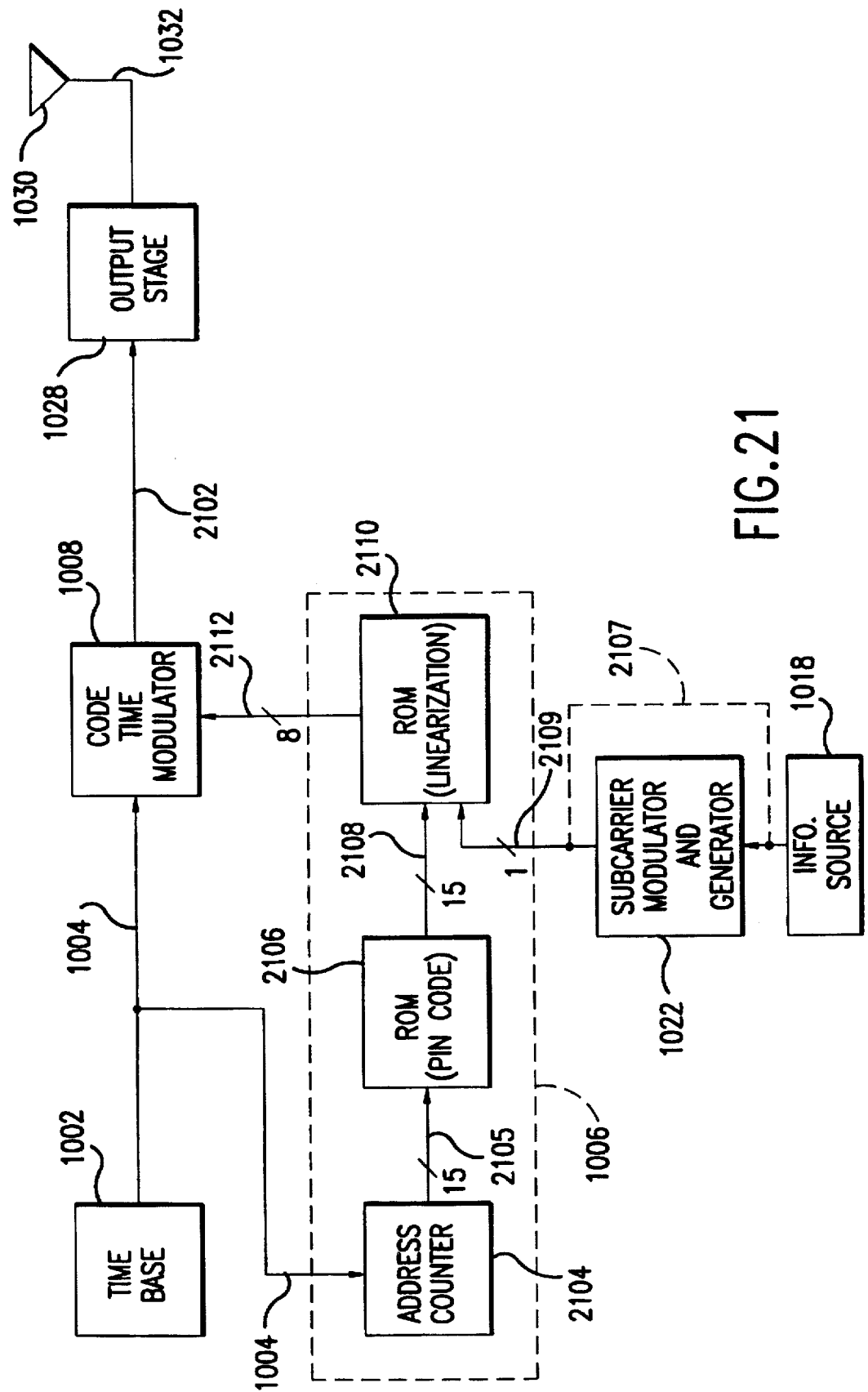
FIG. 21 is a high-level block diagram showing the above linearization scheme in accordance with the present invention.

FIG. 21 is a high-level block diagram showing the above linearization scheme according to the present invention. However, in contrast to the coded timing signal 1014 generated by the code time modulator 1008 of FIG. 10, for example, a direct digital coded timing signal 2102 is produced by the code time modulator 1008 as illustrated in the block diagram of FIG. 21.

In this embodiment, the time base 1002 outputs the periodic timing signal 1004 to the code source 1006. The periodic timing signal 1004 is also provided to the code time modulator 1008, which in this embodiment is a binary-to-time delay generator.

In this embodiment the code source 1006 comprises an address counter 2104 and two read-only memories (ROMs) 2106 and 2110.

The periodic timing signal 1004 increments the address counter 2104 that outputs a multi-bit address 2105. In this example embodiment, the address counter 2104 outputs a 15-bit-wide address 2105 for each pulse of the periodic timing signal 1004.

The address 2105 provided by address counter 2104 is used to access a PN code ROM 2106. The ROM 2106 stores PN (pseudo-random noise) code of a predetermined modulo. (Alternatively, other memory devices such as an EEPROM, RAM, shift registers, or the like can be used.) Each address 2105 output from the address counter 2104 accesses a storage location in the ROM 2106, which in response thereto, outputs a PN code 2108 (preferably a 15-bit PN code). (As described above, the PN codes are used to time-position modulate pulses (e.g., periodic time signal pulse or digital data signal pulses) ahead or back in time for channelization and spreading of the monocycle pulses of the impulse radio signal.)

Linearization data is stored at addressable locations in a linearization ROM 2110. The linearization data is accessed by application of an address (e.g. a 16-bit address) to address inputs of the linearization ROM 2110. According to a preferred embodiment of the present invention, the 16-bit address is formed by the concatenation of the 15-bit PN code 2108 output by ROM 2106 and a 1-bit digital data source (shown by dashed line 2107, which is analogous to 1024 of FIG. 10) provided by information source 1018, for example.

Alternatively, the digital data provided by information source 1018 can be used to modulate a subcarrier using the subcarrier/generator 1022, as described herein. In this case, the subcarrier/generator 1022 would provide the 1-bit digital data signal (see solid line 2109) to the linearization ROM 2110.

In response to synchronized receipt of a complete input address (16 bits in this example), the linearization ROM 2110 outputs a linearized, modulated timing signal 2112 (which is analogous to 1206 of FIG. 12 and 1302 of FIG. 13). The linearized, modulated timing signal 2112 is preferably 8-bits wide and is provided to the code time modulator (i.e., binary-to-time delay generator) 1008. The code time modulator 1008 uses the modulated timing signal 2112 to time delay the periodic timing signal 1004 and thus output the direct digital coded timing signal 2102.

The linearization ROM 2110 stores linearization data in order to properly linearize time delays provided by the PN code ROM 2106. Each 15 bit pseudo-random code 2108 provided to the linearization ROM 2110 represents a dither time delay used to time modulate the digital data bit 2107 that is simultaneously provided to the linearization ROM 2110. In this embodiment, $2^{15}$ (23,768) different time delays can be used to time modulate the forward time shift of logic 1 or the backward time shift of logic 0. The modulation of the time delay composed by the PN noise code prior to cross correlation in the impulse radio receiver permits recovery of the data. The preferred embodiment of the impulse radio receiver describing this operation is discussed below.

Figure 22:
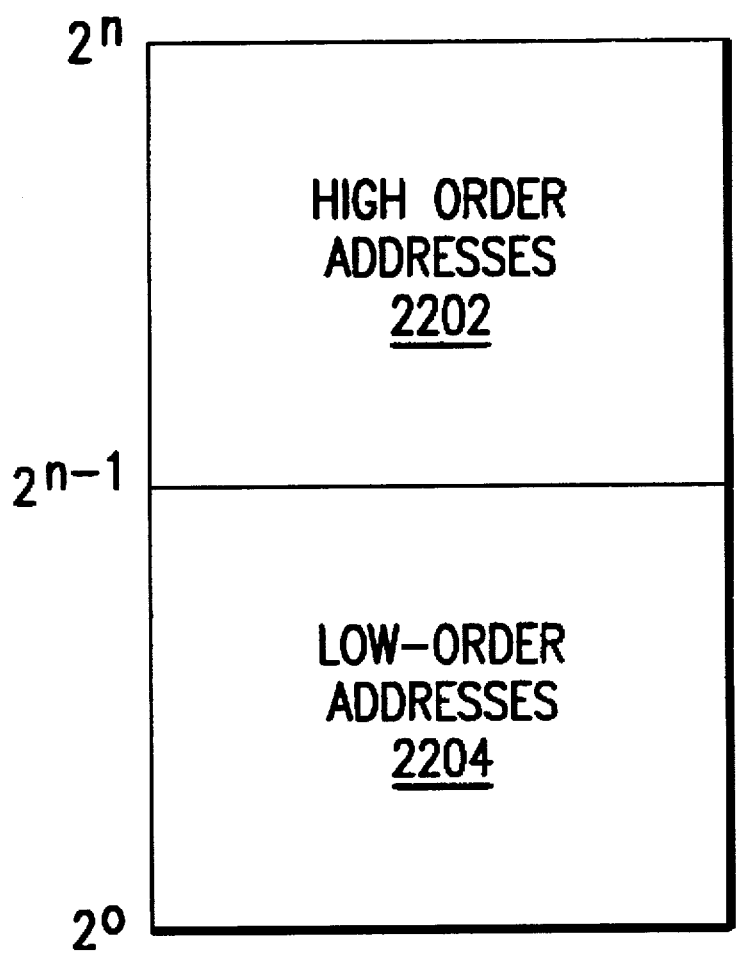
FIG. 22 is a functional diagram illustrating linearization ROM 2110 in accordance with the present invention.

FIG. 22 is a functional diagram illustrating linearization ROM 2110. Locations 2202 and 2204 of the FIG. 22 represent storage locations within the linearization ROM 2110 addressed by high-order addresses and low order addresses, respectively. In this example, each storage location can store 8 bits of data. Thus, in this example, the data stored within the linearization ROM 2110 is separated in two groups: the data in locations 2202 and the data in locations 2204. The first group of data (locations 2202) represents linearization data used when digital data source 2107 is a logic 1, for example, and the linearization data stored in the second group (locations 2204) represent linearization data used when digital data source 2107 is a logic 0. Thus, the logic value of the digital data source 2107 which forms the most significant bit of the ROM address dictates whether linearization data will be output from blocks 2202 or from blocks 2204.

The 15 bits of PN code 2108 applied to the 15 least significant address inputs of the linearization ROM 2110 are used to select which specific ROM location within either selected set of locations 2202 or 2204 will be output by linearization ROM 2110.

In a further embodiment of the present invention, the PN codes can be mathematically combined with the linearization data and the resultant numeric information can be stored directly in a single ROM, or the like. This further embodiment avoids the need for two ROMs. The address counter 2104 would simply directly input addresses to a single PN code/linearization ROM. (In spread spectrum theory, each element of a PN code is called a "chip." Thus, a PN code having a length of modulo N comprises a total of N chips.) Rather than the first ROM outputting a desired delay value for each code chip and then linearize each delay value, a single ROM can be used to store a linearized version of the desired delay for each code chip.

Figure 23:
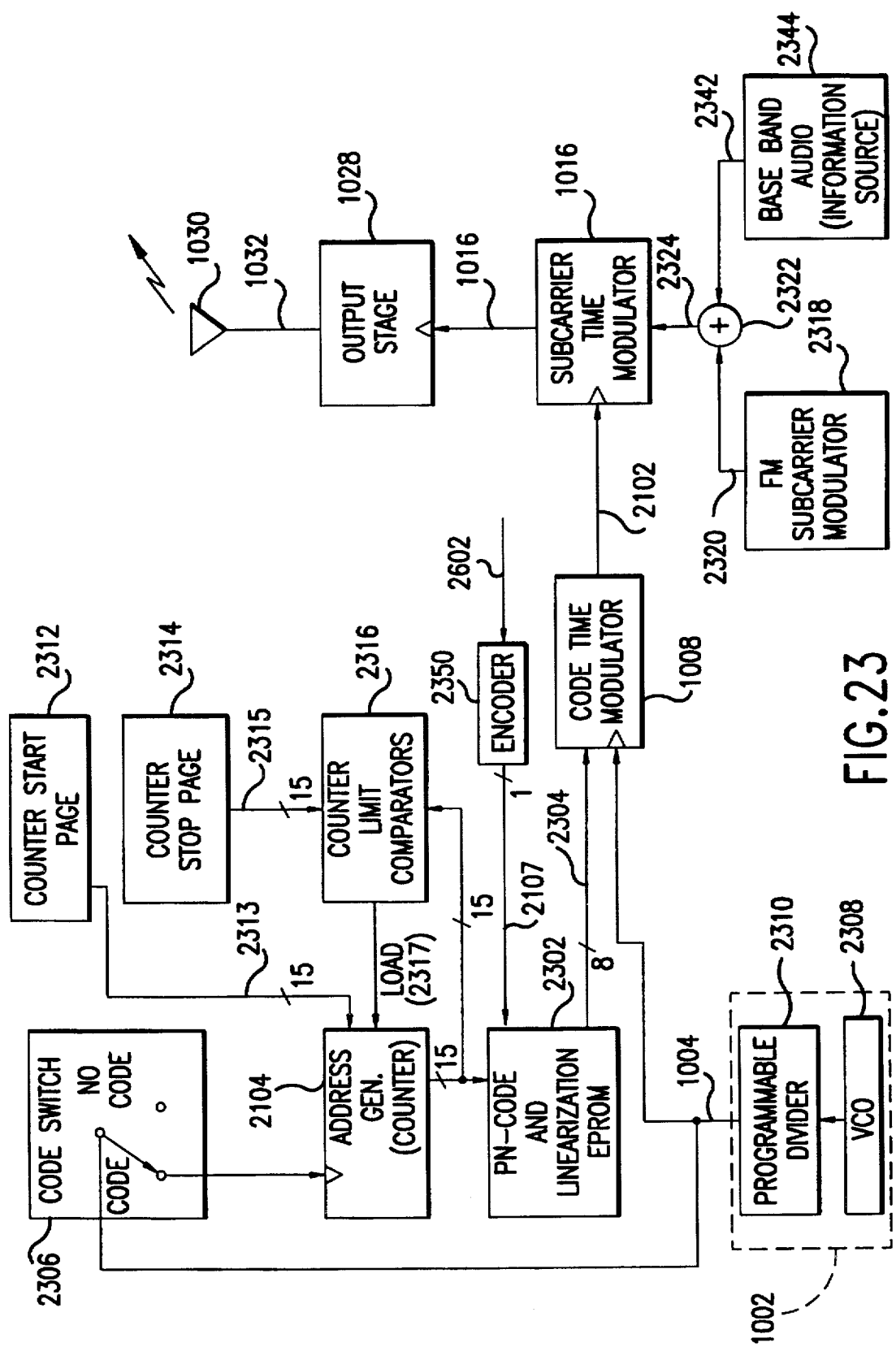
FIG. 23 shows a combined PN code and linearization E-PROM in accordance with the present invention.

A still further embodiment of the impulse radio transmitter is shown in the block diagram, FIG. 23. In FIG. 23 a combined PN code and linearization E-PROM 2302 is used to generate an 8-bit coded information signal 2304, which represents a time delay to be generated by the code time modulator 1008. Use of the PN code can be switched on and off using a code switch 2306. The code may be eliminated for various reasons, such as a separate operational mode that permits accelerated signal acquisition and lock at the impulse radio receiver. The code switch 2306 can be controlled by a simple switch, separate control logic, a microprocessor, or the like. With the code switched on, as shown in FIG. 23, the time base 1002 is used to clock the address generator 2104, as described above in connection with FIG. 21. However, in FIG. 23, the time base is shown as being implemented with a VCO 2308 and a programmable divider 2310. The functions performed by the VCO 2308 and the programmable divider 2310 would be apparent to a person skilled in the relevant art.

In accordance with the embodiment illustrated in FIG. 23, a counter start page block 2312, a counter stop page block 2314 and a counter limit comparator block 2316 are included. The counter start page block 2312 provides an address (preferably 15 bits) to the address generator 2104 to indicate a starting address. The counter stop page block 2314 provides an address (also preferably 15 bits) to the counter limit comparator block 2316 to indicate a stop address. The counter limit comparators of block 2316 comprise logic to compare the address, generated by the address generator 2104, to the stop page address provided by counter stop page 2314. The counter limit comparators block 2316 generates a load signal 2317 and forwards the load signal 2317 to the address generator 2104 when a comparison of these addresses yields an equality. In response to receipt of the load signal 2317, the address generator 2104 is reset and begins counting again at the 15-bit address specified by the counter start page 2312. The process of counting up from the start page address to the stop page address is repeated continuously. The repeating of these addresses permits the PN code and linearization E-PROM 2306 to modulate the digital data with a PN code modulo of a length determined by the difference between the counter start page and the counter stop page addresses.

As noted above, combined PN code and linearization E-PROM 2302 is used to generate an 8-bit coded information signal 2304, which represents a time delay to be generated by the code time modulator 1008. Code time modulator 1008 time position modulates the coded information signal 2304 using the periodic timing signal 1004. The code time modulator 1008 outputs the direct digital coded timing signal 2102, as described above in connection with FIG. 21.

The embodiment illustrated in FIG. 23 also includes an FM subcarrier modulator 2318. The FM subcarrier modulator 2318 generates a sinusoidal signal 2320. The sinusoidal signal 2320 is summed with baseband audio signal 2342 provided by baseband audio source 2344 at a summer 2322. Note that baseband audio source is an example of information source 1018.

The summer 2322 outputs a modulator signal 2324 used by the subcarrier time modulator 1016 in a manner similar to that described above in connection with FIG. 10. When decoded by the impulse radio receiver, the recovered sinusoidal signal 2320 can be used as a control signal by the impulse radio receiver. Thus, the embodiment of the impulse radio transmitter illustrated by FIG. 23 transmits three separate information conveying signals in a single impulse radio transmission. These three information conveying signals comprise the digital data 2107, the sinusoidal signal 2320 and the baseband audio signal 2342.

Alternatively, block 2344 in FIG. 23 can be replaced by a subcarrier generator and modulator 1022, as described above in connection with FIG. 10, or blocks 1018 and 2318 could each be replaced with one of the subcarrier generators/modulators 1702, 1704, 1706, as described above in connection with FIG. 17.

According to still a further embodiment, the direct digital coded timing signal 2102 can be directly input to the output stage 1028. In this embodiment, Manchester coding is the only form of subcarrier modulation performed. Other configurations will be apparent to a person skilled in the relevant art after reading this disclosure.

V.2. Receiver

Figure 24:
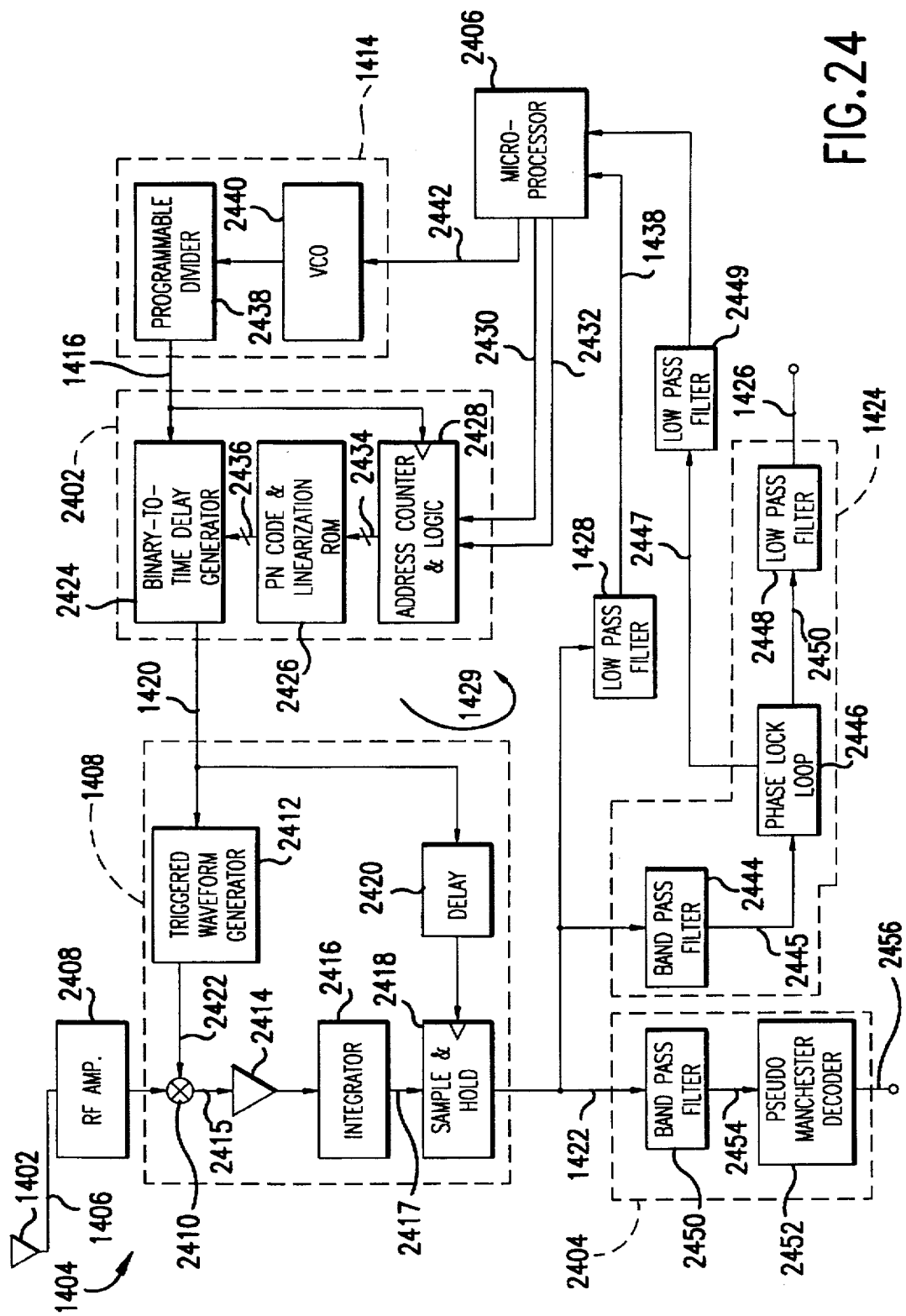
FIG. 24 illustrates a further embodiment of the impulse radio receiver in accordance with the present invention.
Figure 25A:
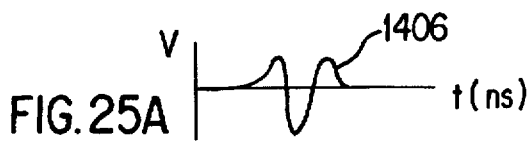
FIGS. 25A, 25B, 25C, 25D, 25E, 25F, 25G and 25H illustrate time(t) versus voltage plots of various signals numbered in FIG. 24 in accordance with the present invention.
Figure 25B:
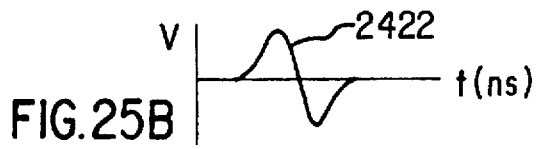
Figure 25C:
Figure 25D:
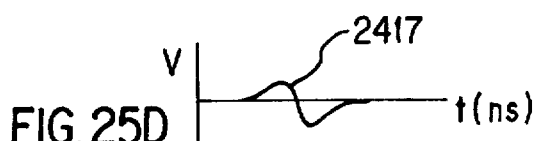
Figure 25E:
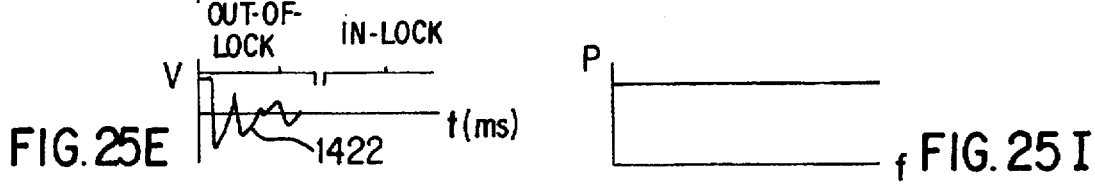
Figure 25I:
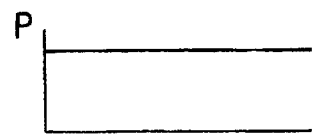
FIGS. 25I, 25J, 25K and 25L illustrate frequency versus amplitude plots corresponding to FIGS. 25E–25H in accordance with the present invention.
Figure 25F:
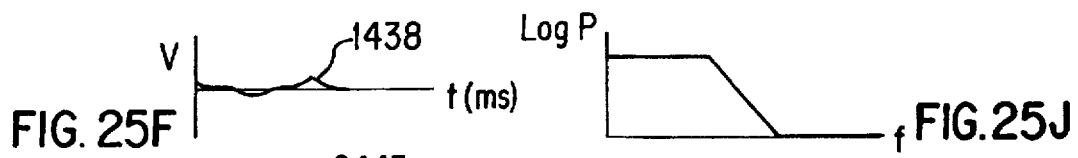
Figure 25J:
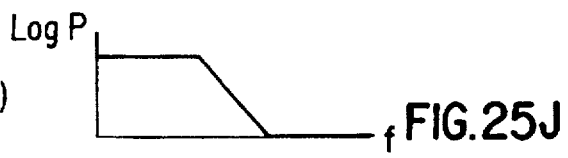
Figure 25G:
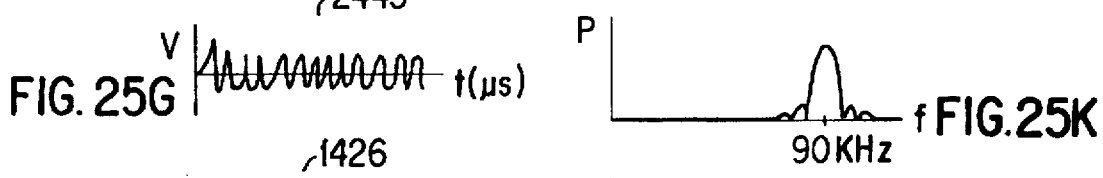
Figure 25K:
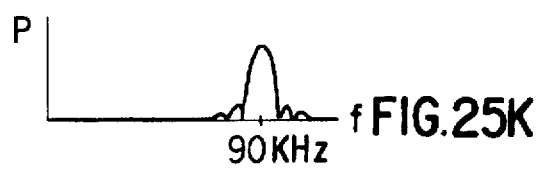
Figure 25H:
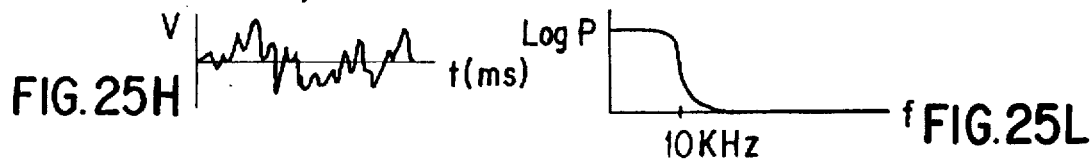
Figure 25L:
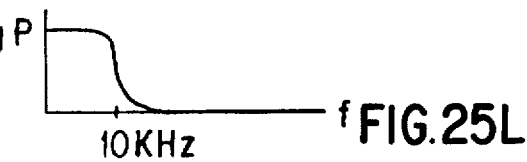

A further embodiment of the impulse radio receiver is illustrated in FIG. 24. This embodiment of the impulse radio receiver is similar in many respects to the receiver described above in connection with FIG. 14. The receiver illustrated in FIG. 24 comprises a cross correlator 1408, a subcarrier demodulator 1424, a low pass filter 1428, an adjustable time base 1414, a decode timing modulator/decode source 2402, a pseudo Manchester decoder 2404 and a microprocessor 2406.

According to this embodiment, a propagation signal (1404) is received by the impulse radio receiver antenna 1402, which passes the received signal 1406 to an RF amplifier 2408. The RF amplifier 2408 amplifies and passes the received signal to the cross correlator 1408.

The cross correlator 1408 can include a multiplier 2410, a triggered waveform generator 2412, an amplifier 2414, an integrator 2416, a sample and hold unit 2418, and a delay unit 2420. The multiplier 2410 is a double balanced mixer adapted to operate in the linear mode. The multiplier 2410 linearly multiplies the received signal with a template signal 2422 generated by the triggered waveform generator 2412. A product signal 2415 of the multiplier 2410 is buffered by amplifier 2414 and then integrated over time by integrator 2416. The integrator is essentially a low-pass filter of first order, which is adapted to respond on a time scale similar to the width of the monocycle (i.e., 157 ps). Integrator 2416 outputs a signal 2417 to the sample and hold unit 2418 that holds the peak value of signal 2417.

The delay unit 2420 is for proper triggering of the sample and hold unit 2418. The delay unit 2420 allows for delay caused by the multiplier 2410, and the amplifier 2414, and for integrator settling time. In one embodiment, the delay unit 2420 delays triggering approximately 10–15 ns after the peak value produced by the integrator 2416. As a result, sampling occurs before the integrated value degrades.

According to this embodiment of the impulse radio receiver, the decode signal 1420 is generated in a manner similar to generation of the direct digital coded time signal 2102, discussed above in connection with FIG. 21. The main difference for block 2402 in the impulse radio receiver, versus the impulse radio transmitter, is that a data source is not used to access the PN code/linearization ROM.

Decode timing modulator/decode source 2402 comprises a binary-to-time delay generator 2424, a PN code and linearization ROM 2426, and an address counter and limit logic block 2428. Start address and stop address signals are provided to the address counter and limit logic block 2428 from the microprocessor 2406 via lines 2430 and 2432, respectively. Addresses are output from the address counter and limit logic block 2428 via a bus 2434. The address counter and limit logic block 2428 provides addresses to access the PN code and linearization ROM 2426 when triggered by the periodic timing signal 1416 provided by the adjustable time base 1414. A PN code (that corresponds to a known PN code used by an impulse radio transmitter) is output by the PN code and linearization ROM 2426 via a bus 2436 and is provided to the binary-to-time delay generator 2424. The binary-to-time delay generator 2424 time modulates the periodic timing signal 1416 (received from adjustable time base 1414) to generate the decode signal 1420.

In this example, the adjustable time base 1414 comprises a programmable divider 2438 and a voltage controlled oscillator (VCO) 2440, which are used to output the periodic timing signal 1416. A voltage control signal is provided to the VCO 2440 from the microprocessor 2406 via a line 2442 to adjust the VCO output, as will be apparent to a person skilled in the relevant art.

In this example, the subcarrier demodulator 1424, comprises a bandpass filter 2444, a phase-locked loop 2446, and a low-pass filter 2448. The function performed by the phase-locked loop 2446 is equivalent to that performed by similar phase-locked loops (2004) in FIG. 18. Similarly, the bandpass filter 2444 performs a similar function as the band filters 1802 in FIG. 18. In this case, bandpass filter 2444 outputs a filtered signal 2445 to the phase-locked loop 2446. The phase-locked loop 2446 outputs an in-phase estimate signal 2447 via a further low pass filter 2449 to the microprocessor 2406. The in-phase estimate signal 2447 provides the microprocessor 2406 with an estimate of the amplitude of the subcarrier so that the microprocessor 2406 can assess the quality of signal lock. A demodulated output signal 2450 of the phase-locked loop 2446 is filtered by low-pass filter 2448, which in turn outputs demodulated information signal 1426.

The overall functionality and operation of the subcarrier demodulator 1424 in FIG. 24 is substantially the same as that described above in connection with FIG. 14. The control loop 1429 has the same functionality as described above in connection with FIG. 14.

Additional subcarrier modulation is achieved according to another aspect of the invention using pseudo Manchester coding of digital data. It is referred to as "pseudo" because conventional Manchester coding performs digital decoding. According to the present invention, however, decoding of Manchester encoded signals is performed in the analog domain. The pseudo-Manchester encoding shifts digital information from the baseband to a frequency equivalent to an integral submultiple of the adjustable time base, or integer multiples of the time base. This achieves a coherent shift of digital data for proper recovery in the impulse radio receiver.

In this embodiment, the pseudo Manchester decoder 2404 comprises a bandpass filter 2450 and an analog Manchester decoder 2452. The bandpass filter 2450 receives the baseband signal 1422 from cross correlator 1408. A filtered baseband signal 2454 is provided to analog Manchester decoder 2452. The decoding performed by the analog Manchester decoder 2452 is best described after explanation of the actual encoding performed at the transmitter.

Additionally, various signals numbered in FIG. 24 are illustrated as time (t) versus voltage plots in FIGS. 25A-25H. Additional FIGS. 25I-25L are frequency versus amplitude (P or log P) plots that correspond to FIGS. 25E-25H.

VI. Pseudo Manchester Modulation

This section is directed to pseudo Manchester coding for modulation of digital data using impulse radio communications.

Using the direct digital modulation approach, described above in connection with FIG. 24, a problem may arise when the data source generates a long string of logic "1's" or logic "0's". Because the data is recovered using the phase-locked loop, the low-frequency energy in such a string of "1's" or "0's" appears in the low-pass filter 1428 thus introducing a phase error in the error loop 1429. A method of separating the modulation frequency components from those expected in the error loop 1429 is necessary.

Accordingly, the inventors have developed further subcarrier embodiment. This further subcarrier embodiment comprises a modulation scheme in which data is synchronously exclusive-ORed (XORed) with a square wave whose frequency is at least two times the frequency of the data signal (a 2×clock) in the manner of Manchester coding. Use of Manchester coding in a impulse radio system is a subcarrier technique because the data is modulated to a higher frequency using the 2×clock.

The impulse radio receiver removes this modulation in an analog fashion rather than digitally, as is done with true Manchester decoding. The voltage from the sample-and-hold (2418) is modulated by a synchronous 2×clock, and sequentially processed by a low-pass filter followed by a comparator (not shown). The simplest embodiment is a low-pass filter set to cut off at a frequency above approximately half the bit rate; however, more complex filtering would be needed for use with other translation methods. Thus, the pseudo Manchester modulation technique, according to this aspect of the present invention, converts non-return-to-zero (NRZ) digital signals to return-to-zero (RZ) signals to avoid errors in the phase-locked loop of the impulse radio receiver. The return-to-zero encoder (see encoder 2350 in FIG. 23, for example, which encodes a digital data signal such as signal 2602 described below in connection with FIGS. 26A-26C) can be a pseudo Manchester direct digital encoder, a frequency shift keying encoder, an n-ary phase modulation encoder (e.g., quadrature phase shift keying (QPSK)) or a phase amplitude modulation encoder, or other frequency translation means as would be apparent to a person skilled in the relevant art.

The pseudo Manchester coding scheme according to the present invention uses a standard implementation of Manchester coding in the impulse radio transmitter. The digital data stream is Manchester coded before it is used to address the PN-code and linearization E-PROM 2302, for example (see FIG. 23). The circuitry to implement Manchester coding of the digital data stream would be apparent to a person skilled in the relevant art.

FIGS. 26A-26C and 27A-27G show exemplary waveforms for pseudo Manchester encoding and decoding, respectively, according to the present invention. In FIGS. 26A-26C, a sample digital data stream of logic 1's and 0's is shown generally at a waveform 2602. In the impulse radio transmitter, the data is XORed with a square wave whose frequency is at least two times the frequency of the data signal (a 2×clock), as shown at a waveform 2604. The waveform 2604 must be synchronous and have transitions aligned with a data bit edge. The XORed result of waveforms 2602 and 2604 is shown generally at a waveform 2606. This process ensures a zero-to-one or one-to-zero transition at the middle of each bit period, which eliminates problems associated with a long run of 1's or 0's.

In connection with the pseudo Manchester coding embodiment, the impulse radio receiver performs pseudo Manchester decoding to recover the digital data signal. A set of waveforms illustrating the functions performed to recover the data are shown in a FIGS. 27A-27G. Once a received impulse radio signal is cross correlated in the impulse radio receiver, it is passed through the bandpass filter 2450. The output 2454 of bandpass filter 2450 resembles an exemplary waveform shown generally at 2702.

The filtered baseband signal 2454 is fed to a first input of an analog multiplier (not shown). The second input of the analog multiplier receives a synchronous, 2×clock signal (2704). The analog multiplier reverses the process performed by the impulse radio transmitter. A product (output) signal of the analog multiplier is shown generally at a waveform 2706. The product signal is low-pass filtered and compared with a predetermined comparison level, as shown generally by the waveform at 2708, thus yielding a compare data signal 2710. The compare data signal 2710 is held at the peak of the impulse/response point of the filter (using a sample and hold unit), via the rising edge of a data strobe signal (shown generally at waveform 2712), to produce recovered data 2465, shown generally at a waveform 2714. The analog recovery technique, according to the present invention, takes advantage of the coherent link, i.e., synchronous recovery, to reduce the noise as much as theoretically possible with filtering.

VII. Lock Acquisition Scheme

This section is directed to a lock acquisition scheme for the impulse radio receiver to acquire and maintain lock of impulse radio signals.

Figure 28:
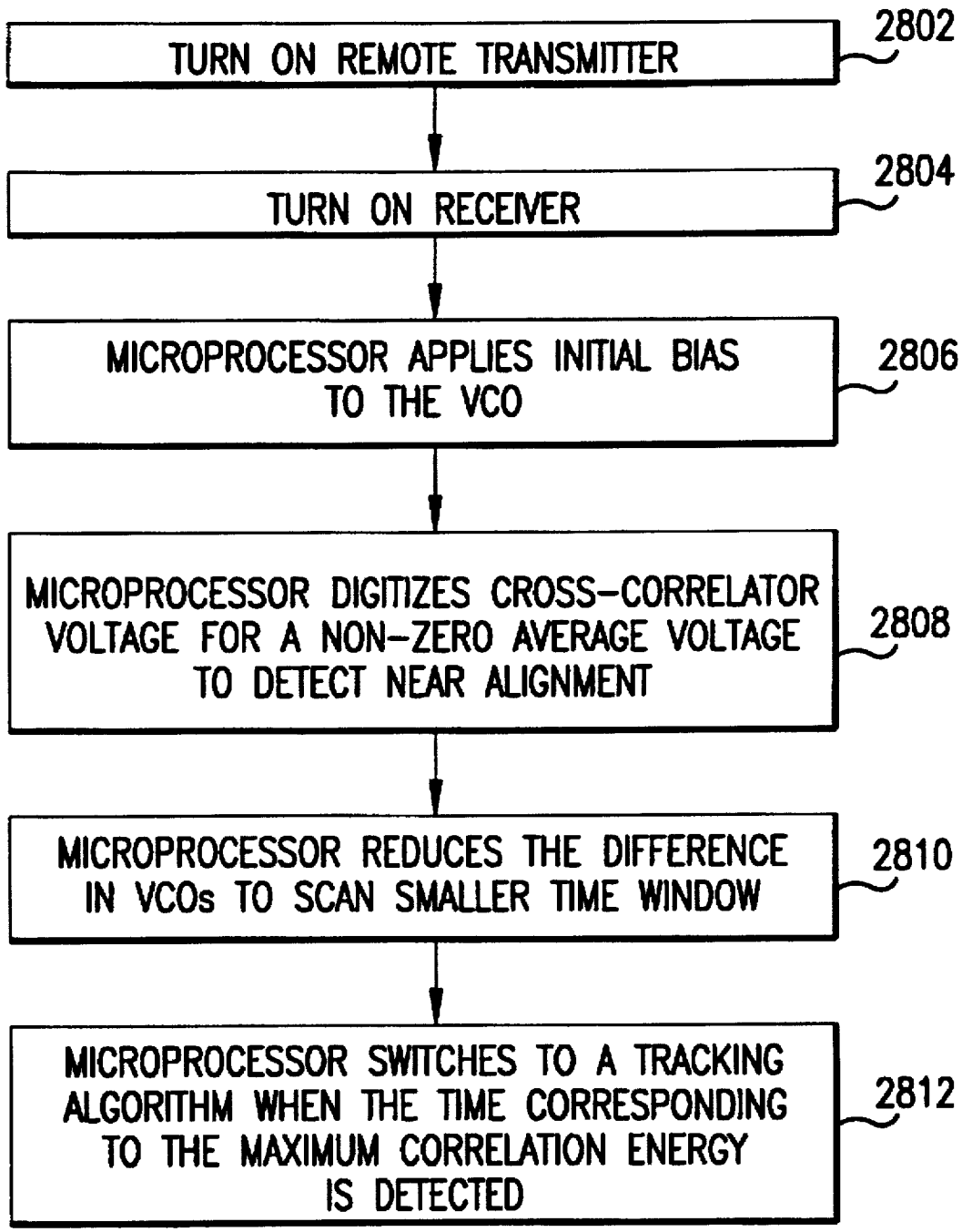
FIG. 28 is a high-level block diagram of operations performed by the impulse radio receiver to acquire lock in accordance with the present invention.

As with all communications receivers, the impulse radio receiver must first acquire and maintain a "lock" on the signal, before data can be recovered. FIG. 28 is a high level block diagram of operations performed by the impulse radio receiver to acquire lock.

Once the transmitter and receiver are turned on, as shown at steps 2802 and 2804, respectively, the microprocessor 2406 applies bias to the VCO 2440 (as shown at a step 2806) to cause the lock loop 1429 to drift at a programmed rate faster (or slower) than the remote transmitter's transmit period, as shown at a step 2808. A few parts-per-million is a typical offset.

Next, the microprocessor 2406 digitizes the voltage from the cross correlator 1408 (received via the filter 1428) looking for a non-zero average voltage, which indicates the template signal is in near alignment with the received signal, as shown at a step 2808. The microprocessor then reduces the difference in rates (receive VCO vs. the transmitter VCO) to begin scanning the time around the perceived time that the energy was detected, as shown at a step 2810.

Alternatively, the digitizing performed by the microprocessor 2406 could be done using separate A/D converter hardware. Similarly, filtering could be done by the microprocessor, discrete components or active filters, as would be apparent to a person skilled in the art.

When the time corresponding to the maximum correlation energy is detected, the microprocessor switches to a tracking algorithm in which the correlator's average voltage is kept to zero, as shown at a step 2812. This tracking is analogous to the quadrature lock algorithm used in conventional CW phase locked loop designs, as would be apparent to a person skilled in the art. Thus, once the tracking algorithm is engaged, subcarrier demodulation of data by the pseudo Manchester decoder 2404 and the subcarrier demodulator 1424 can begin.

VIII. Performance in the Real World

This section describes the performance of the impulse radio communications system in the real world with reference to data collected by the inventors based prototype testing of impulse radio systems.

Figure 29:
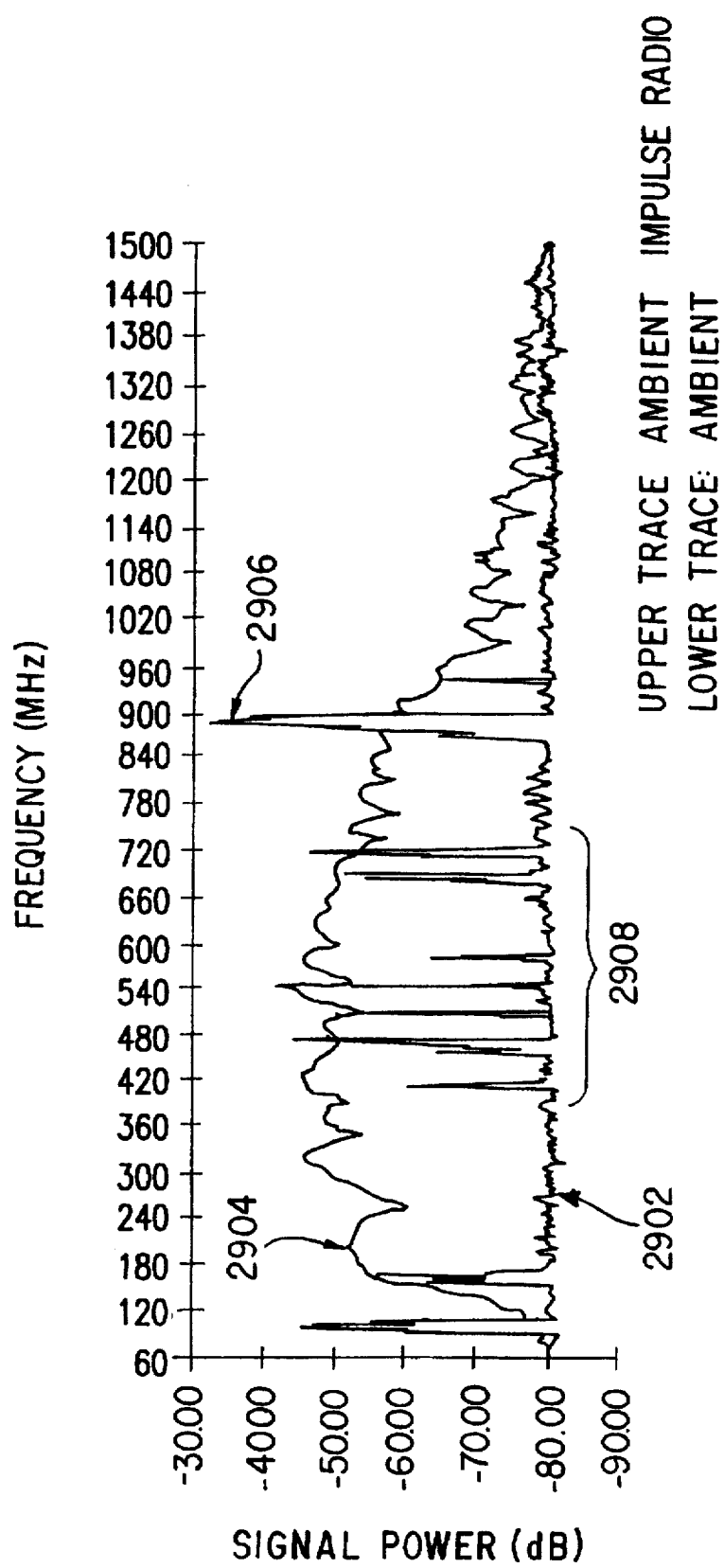
FIG. 29 shows the signal measured at 3 meters as well as ambient signals in accordance with the present invention.

One impulse radio prototype, built by the inventors, has an average radiated power of 450 microwatts (μW). The center frequency is 675 MHz and smoothed by a pseudo-random code with 256 positions. FIG. 29 shows the signal measured at 3 meters (see plot 2902) as well as ambient signals (see plot 2904). Measurements for this figure were not adjusted to compensate for antenna performance and a 1.3 GHz/2 mpps prototype was used with an average output power of 33 μW. A power spike 2906 just below 900 MHz is from two cellular base stations, one about 400 meters distant and another about 1.6 kilometers distant. Spikes 2908 between 360 MHz and 720 MHz are predominantly UHF televisions stations. The 720 MHz spike is a 2.2 megawatt EIRP channel 54 station, Huntsville, Ala., approximately 7 miles distant. (The "bumpiness" of the impulse spectral measurements reflects the impact of frequency domain multipath. Moving the receive antenna causes the location of nulls and peaks to move. This does not impact the performance of the impulse system.)

Impulse radio performance has been measured for a 1.3 GHz/2 mpps prototype (with an average output power of 33 μW) over two paths:

1) With a −9.6 dBi transmit antenna buried in a highly conductive medium having a total loss of 36 dB over a 6 cm path, the inventors used the impulse radio to transmitted a 125 kbps pseudo-random bit stream an additional 4 meters through air to a 10 $dB_i$ receive antenna. The bit error rate was better than $0.5 \times 10^{-5}$.

2) With the same experimental set-up and the same location, the bit rate was lowered to 7.8 kbps and range was increased to 10 meters. The bit error rate was better than $10^{-6}$.

Figure 30:
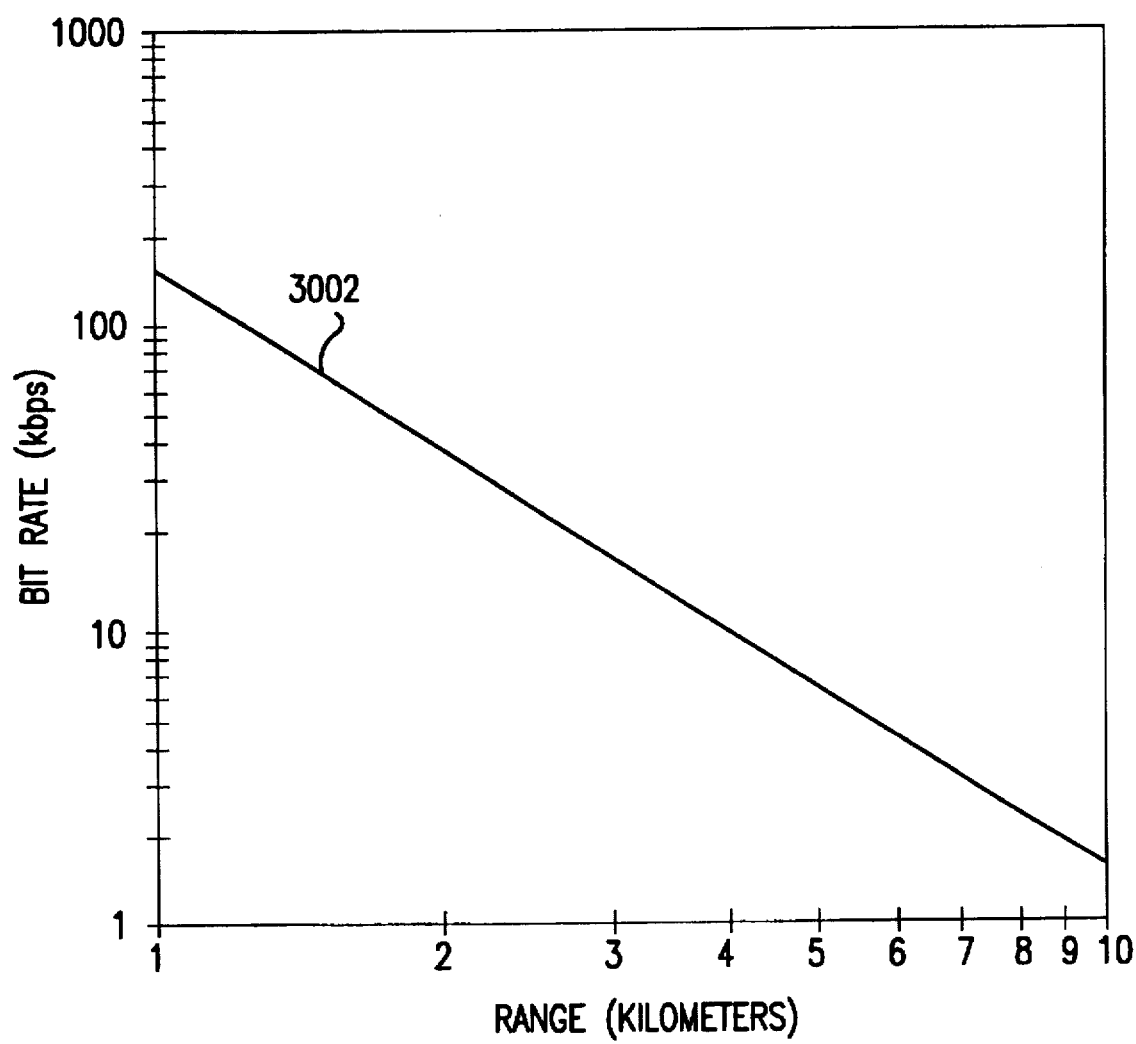
FIG. 30 shows a curve that illustrates a specific example of the projected trade-off between free space range and bit rate in accordance with the present invention.

One can project the performance of the 1.3 GHz/2 mpps simplex link in free space using standard propagation modeling assumptions. FIG. 30 shows a curve 3002 that illustrates the projected trade-off between free space range and bit rate, assuming a 100 μW average power (−10 $dB_m$), a 10 $dB_i$ receive antenna (approximately a 90 n beam), a 2 $dB_i$ transmit antenna (omni-directional dipole-like pattern), an SNR of 19.5 dB (approximately a $10^{-6}$ BER), and a margin of 6 dB.

Figure 31:
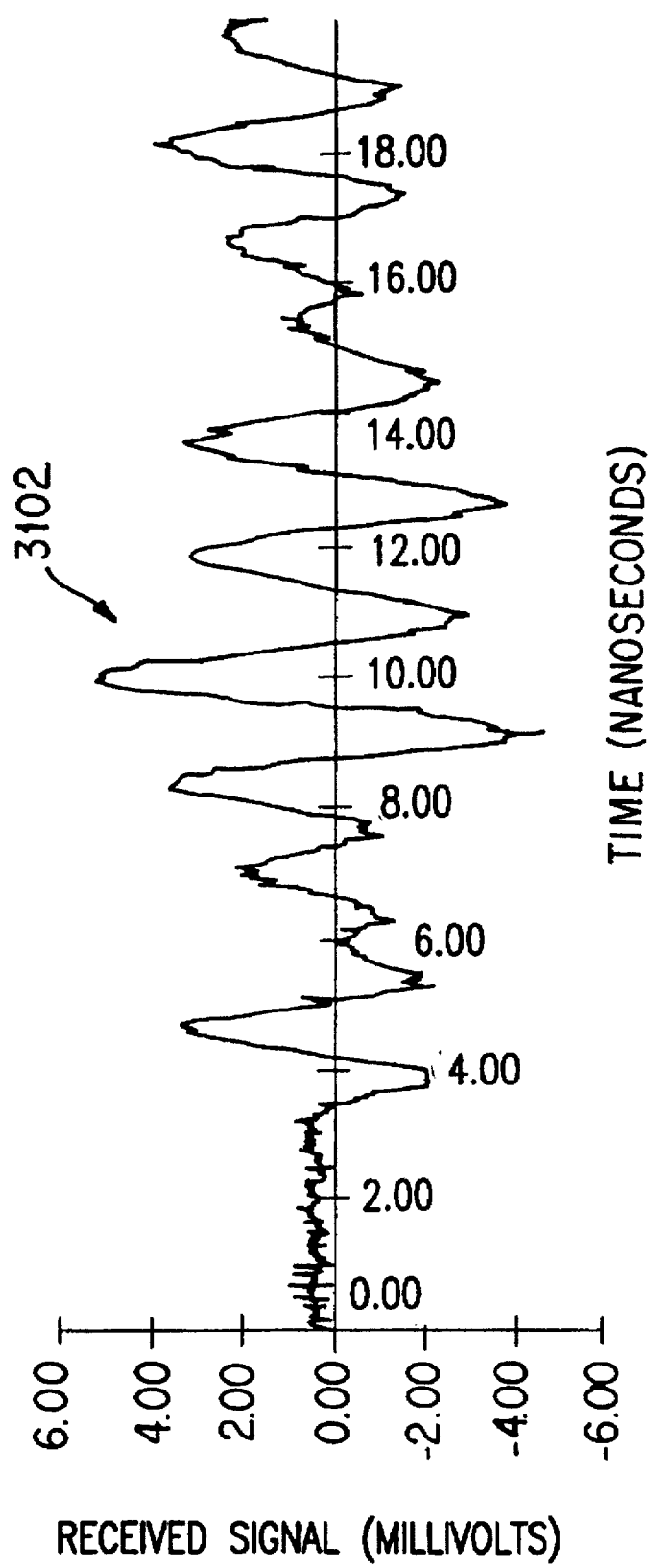
FIG. 31 shows that it is easy to resolve multipath impulse signals in the time domain in accordance with the present invention.

Turning to FIG. 31, this figure shows that it is easy to resolve multipath impulse signals in the time domain. Measurements illustrated at plot 3102 were made in a laboratory in a single story office complex. The laboratory contained many feet of steel shelving, test equipment, and metal filing cabinets. One adjacent office space is occupied by a metal fabricating company. The other is occupied by a personal computer sales offices along with that company's warehouse (using steel shelving).

The first arriving pulse (between 3 ns and 6 ns) is of lower amplitude because it travelled through more walls than some later arriving pulses.

IX. Conclusion

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. An impulse radio transmitter, comprising:
   a. a time base to output a periodic timing signal;
   b. a direct digital modulator that uses said periodic timing signal and an information signal to output a direct digital coded timing signal;
   c. a subcarrier time modulator to receive a subcarrier signal to modulate said direct digital coded timing signal using said subcarrier signal and output a modulated, coded timing signal; and d. an output stage to generate an impulse radio signal using said modulated, coded timing signal, wherein said modulation of said periodic timing signal provides channelization and spectral smoothing of said impulse radio signal.

2. The impulse radio transmitter according to claim 1, further comprising a subcarrier modulator to receive a further information signal and modulate said subcarrier signal using said further information signal to output a modulated subcarrier signal, wherein said modulated subcarrier signal is used by said subcarrier time modulator to output said modulated, coded timing signal.

3. The impulse radio transmitter according to claim 2, wherein said direct digital modulator further comprises a source of linearization data to linearize said direct digital coded timing signal.

4. The impulse radio transmitter according to claim 3, wherein said linearization data and said pseudo-random codes are stored together.

5. The impulse radio transmitter according to claim 4, wherein said linearization data is stored as modified pseudo-random codes.

6. The impulse radio transmitter according to claim 1, wherein said information signal comprises a coded information signal and wherein said direct digital modulator comprises a code time modulator to time modulate said periodic timing signal using said coded information signal and output said direct digital coded timing signal, wherein said time modulation of said periodic timing signal provides further channelization and spectral smoothing of said impulse radio signal.

7. The impulse radio transmitter according to claim 1, wherein said direct digital modulator comprises a source of pseudo-random codes to dither said information signal, thereby outputting said direct digital coded timing signal.

8. An impulse radio transmitter, comprising:

a. a time base to output a periodic timing signal;

b. a code source that uses said periodic timing signal to output a code signal;

c. a linearization code source to receive said code signal and a digital data signal and output a linearized, modulated timing signal;

d. a code time modulator to receive said linearized, modulated timing signal and said periodic timing signal, wherein said code time modulator modulates said periodic timing signal with said linearized, modulated timing signal to output a coded timing signal; and e. an output stage to generate an impulse radio signal using said coded timing signal, wherein said impulse radio signal comprises monocycle pulses spaced in time.

9. The impulse radio transmitter according to claims 8, wherein said code source comprises means for storing pseudo noise codes that are used to produce said code signal.

10. The impulse radio transmitter according to claim 9, wherein said return-to-zero encoder comprises one of a pseudo Manchester encoder, a frequency shift keying encoder, an n-ary phase modulation encoder and a phase amplitude modulation encoder.

11. The impulse radio transmitter according to claim 8, wherein said data signal is encoded by a return-to-zero direct digital encoder.

12. The impulse radio transmitter according to claims 8, wherein said code source and said linearization code source are stored in separate memory units.

13. The impulse radio transmitter according to claims 8, wherein said code source and said linearization code source are combined and stored in separate memory units.

14. The impulse radio transmitter according to claims 8, wherein said code source and said linearization code source are combined and stored in a single memory unit.

15. The impulse radio transmitter according to claims 8, further comprising:

a. a subcarrier modulator to receive a subcarrier signal and an information signal and modulate said subcarrier signal using said information signal and output a modulated subcarrier signal; and b. a subcarrier time modulator to modulate said coded timing signal using said modulated subcarrier signal and output a modulated, coded timing signal;

wherein said output stage generates said impulse radio signal using said modulated, coded timing signal.

16. A system for direct digitally encoding a data signal for an impulse radio communications, comprising:

a. a return-to-zero encoder to direct digitally encode the data signal to produce a direct digitally encoded data signal;

b. means for pseudo noise coding said direct digitally encoded data signal to produce a code signal; and c. a code time modulator to time modulate a periodic timing signal using said code signal and output a coded timing signal, wherein said modulation of said periodic timing signal provides channelization and spectral smoothing for impulse radio communications.

17. The system according to claim 16, wherein said return-to-zero encoder comprises one of a pseudo Manchester encoder, a frequency shift keying encoder, an n-ary phase modulation encoder and a phase amplitude modulation encoder.

18. A method for transmitting impulse radio signals, comprising the steps of:

(1) providing a periodic timing signal;

(2) direct digital modulating said periodic timing signal using an information signal to output a direct digital coded timing signal;

(3) modulating said direct digital coded timing signal using a subcarrier signal to output a modulated, coded timing signal; and (4) generating an impulse radio signal using said modulated, coded timing signal, wherein said modulation of said periodic timing signal provides channelization and spectral smoothing of said impulse radio signal.

19. The method according to claim 18, further comprising the step of modulating said subcarrier signal using a further information signal to output a modulated subcarrier signal, wherein said modulated subcarrier signal is used by a subcarrier time modulator to output said modulated, coded timing signal.

20. The method according to claim 18, further comprising the step of time modulating said periodic timing signal using a coded information signal to output said direct digital coded timing signal.

21. The method according to claim 18, further comprising the step of pseudo-random coding said information signal.

22. The method according to claim 21, further comprising the step of linearizing said direct digital coded timing signal.

23. The method according to claim 22, wherein said step of pseudo-random coding said information signal and linearizing said direct digital coded timing signal are performed simultaneously.

24. The method according to claim 18, further comprising the step of encoding said information signal as a return-to-zero direct digital signal.

25. The method according to claim 24, further comprising the step of encoding said return-to-zero direct digital signal using one of pseudo Manchester encoding, frequency shift keying encoding, n-ary phase modulation encoding and phase amplitude modulation encoding.

26. A method for transmitting impulse radio signals, comprising the steps of:

(1) producing a code signal using a periodic timing signal;

(2) producing a linearized, modulated timing signal based on said code signal and a data signal using a linearization code source;

(3) modulating said periodic timing signal with said linearized, modulated timing signal to output a coded timing signal; and (4) generating an impulse radio signal using said coded timing signal.

27. The method according to claim 26, further comprising the step of pseudo-random coding said data signal.

28. The method according to claim 27, wherein said step of pseudo-random coding said data signal and producing said linearized, modulated timing signal are performed simultaneously.

29. The method according to claim 26, further comprising the step of encoding said data signal as a return-to-zero direct digital signal.

30. The method according to claim 29, further comprising the step of encoding said return-to-zero direct digital signal using one of pseudo Manchester encoding, frequency shift keying encoding, n-ary phase modulation encoding and phase amplitude modulation encoding.

31. A method for direct digitally encoding a data signal for an impulse radio communications, comprising the steps of:

(1) return-to-zero encoding the data signal to produce a direct digitally encoded data signal;

(2) pseudo noise coding said direct digitally encoded data signal to produce a code signal; and (3) time modulating a periodic timing signal using said code signal to output a coded timing signal, wherein said modulation of said periodic timing signal provides channelization and spectral smoothing for impulse radio communications.

32. The method according to claim 31, wherein said step of return-to-zero encoding comprises one of pseudo Manchester encoding, frequency shift keying encoding, n-ary phase modulation encoding and phase amplitude modulation encoding.

* * * * *

UNITED STATES PATENT AND TRADEMARK OFFICE
CERTIFICATE OF CORRECTION

PATENT NO. : 5,677,927

DATED : October 14, 1997

INVENTORS : Fullerton et al.

It is certified that an error appears in the above-identified patent and that said Letters Patent is hereby corrected as shown below.

On the title page, item [56], please add the following U.S. Patent Documents:

| | | | |
|---|---|---|---|
| 3,720,950 | 3/1973 | Vehrs, Jr. | 343/17.2PC |
| 3,728,632 | 4/1973 | Ross | 325/38R |
| 3,864,635 | 2/1975 | Ewanus | 325/421 |
| 4,122,393 | 10/1978 | Gordy et al. | 375/343 |
| 4,545,061 | 10/1985 | Hileman | 375/373 |
| 4,550,414 | 10/1985 | Guinon et al. | 375/207 |
| 4,641,317 | 2/1987 | Fullerton | 375/1 |
| 4,688,232 | 8/1987 | Fox | 375/87 |
| 4,743,906 | 5/1988 | Fullerton | 342/27 |
| 4,813,057 | 3/1989 | Fullerton | 375/37 |
| 4,937,580 | 6/1990 | Wills | 342/22 |
| 4,979,186 | 12/1990 | Fullerton | 375/23 |
| 5,268,926 | 12/1993 | Sebilet | 375/200 |
| 5,363,108 | 11/1994 | Fullerton | 342/27 |

UNITED STATES PATENT AND TRADEMARK OFFICE
CERTIFICATE OF CORRECTION

PATENT NO. : 5,677,927

DATED : October 14, 1997

INVENTORS : Fullerton et al.

It is certified that an error appears in the above-identified patent and that said Letters Patent is hereby corrected as shown below.

On the title page, item [73], delete the Assignee name "Pulson Communications Corporation", and replace it with -- Time Domain Corporation --;

In column 8, delete equation (1) and replace it with the following equation:

$$V(t) = A\frac{\sqrt{2e}}{\tau}te^{-(\frac{t}{\tau})^2} \tag{1}$$

Signed and Sealed this

Twenty-second Day of September, 1998

Attest:

BRUCE LEHMAN

Attesting Officer

Commissioner of Patents and Trademarks